(12) United States Patent
Miller

(10) Patent No.: US 11,028,256 B2
(45) Date of Patent: *Jun. 8, 2021

(54) SILICA-CONTAINING RUBBER COMPOSITIONS CONTAINING SPECIFIED COUPLING AGENTS AND RELATED METHODS

(71) Applicant: Bridgestone Americas Tire Operations, LLC, Nashville, TN (US)

(72) Inventor: Seth M. Miller, Wooster, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/708,355

(22) Filed: Dec. 9, 2019

(65) Prior Publication Data

US 2020/0123349 A1   Apr. 23, 2020

Related U.S. Application Data

(63) Continuation of application No. 15/513,835, filed as application No. PCT/US2015/051310 on Sep. 22, 2015, now Pat. No. 10,526,475.

(60) Provisional application No. 62/054,816, filed on Sep. 24, 2014.

(51) Int. Cl.

| C08L 9/06 | (2006.01) |
|---|---|
| C08K 5/5425 | (2006.01) |
| C08K 5/548 | (2006.01) |
| B60C 1/00 | (2006.01) |
| C08K 3/36 | (2006.01) |
| C08L 7/00 | (2006.01) |
| C08L 15/00 | (2006.01) |
| C08L 9/00 | (2006.01) |

(52) U.S. Cl.
CPC .............. *C08L 9/06* (2013.01); *B60C 1/0016* (2013.01); *C08K 3/36* (2013.01); *C08K 5/548* (2013.01); *C08K 5/5425* (2013.01); *C08L 7/00* (2013.01); *C08L 9/00* (2013.01); *C08L 15/00* (2013.01); *C08L 2205/025* (2013.01); *C08L 2205/03* (2013.01); *C08L 2205/035* (2013.01)

(58) Field of Classification Search
CPC ............................. C08K 5/5425; C08K 5/548
See application file for complete search history.

(56) References Cited

U.S. PATENT DOCUMENTS

| 4,048,356 | A | 9/1977 | Bakos et al. |
|---|---|---|---|
| 5,990,223 | A | 11/1999 | DeGroot et al. |
| 6,313,210 | B1 | 11/2001 | Lin et al. |
| 6,350,797 | B1 | 2/2002 | Weller |
| 6,384,117 | B1 | 5/2002 | Hergenrother et al. |
| 6,384,118 | B1 | 5/2002 | Hergenrother et al. |
| 6,512,035 | B1 | 1/2003 | Hergenrother et al. |
| 6,608,145 | B1 | 8/2003 | Lin et al. |
| 7,119,150 | B2 | 10/2006 | Lin et al. |
| 7,259,204 | B2 | 8/2007 | Zhou et al. |
| 8,329,297 | B2 | 12/2012 | Hergenrother et al. |
| 10,526,475 | B2 * | 1/2020 | Miller ............... C08L 15/00 |
| 2002/0016393 | A1 | 2/2002 | Hogan et al. |
| 2002/0026001 | A1 | 2/2002 | Hergenrother et al. |
| 2003/0055139 | A1 | 3/2003 | Cruse |
| 2003/0181565 | A1 | 9/2003 | Panz et al. |
| 2004/0152811 | A1 | 8/2004 | Lin et al. |
| 2004/0225038 | A1 | 11/2004 | Lin et al. |
| 2005/0027717 | A1 | 12/2005 | Joshi et al. |
| 2006/0086450 | A1 | 4/2006 | Hogan et al. |
| 2006/0089446 | A1 | 4/2006 | Lin et al. |
| 2006/0106143 | A1 | 5/2006 | Lin et al. |
| 2007/0155890 | A1 | 7/2007 | Chen et al. |
| 2008/0161459 | A1 | 7/2008 | Cruse et al. |
| 2008/0161460 | A1 | 7/2008 | York et al. |
| 2008/0161461 | A1 | 7/2008 | Cruse et al. |
| 2008/0293858 | A1 | 11/2008 | Hergenrother et al. |
| 2009/0171014 | A1 | 7/2009 | Hergenrother et al. |
| 2011/0180195 | A1 | 7/2011 | Hergenrother et al. |
| 2012/0225233 | A1 | 9/2012 | Guy |

(Continued)

FOREIGN PATENT DOCUMENTS

| EP | 0236674 A2 | 9/1987 |
|---|---|---|
| EP | 1326913 B1 | 8/2005 |
| EP | 1761569 B1 | 11/2009 |

(Continued)

OTHER PUBLICATIONS

Lin, Chenchy Jr., et al., "Mooney Viscosity Stability and Polymer Filler Interactions in Silica Filled Rubbers," paper 58 (pp. 215-245), Spring Technical Meeting, Rubber Division, ACS, Apr. 24-27, 2001.

Nakamra, Yoshinobu, et al. "Mechanical Properties of Silane-Treated Silica Particle-Filled Polyisoprene Composites: Influence of the Alkoxy Group Mixing Ratio in Silane Coupling Agent Containing Mercapto Group," J. Appl. Polym. Sci., pp. 2548-2555, 2013.

(Continued)

*Primary Examiner* — Vickey Nerangis
(74) *Attorney, Agent, or Firm* — Meredith E. Hooker; Jenny L. Sheaffer

(57) ABSTRACT

Disclosed herein are rubber compositions comprising a conjugated diene-containing polymer, a reinforcing filler including silica, a bi-functional silane coupling agent, and an unsaturated, non-sulfur silane coupling agent, where the ratio of the bi-functional silane coupling agent to the unsaturated, non-sulfur silane coupling agent is from about 5:1 to about 20:1. Also disclosed are related methods which include both in-situ reaction of the silica filler and the unsaturated, non-sulfur silane coupling agent and pre-reacting of at least a portion of the silica filler and at least a portion of the unsaturated, non-sulfur silane coupling agent.

18 Claims, No Drawings

(56) References Cited

U.S. PATENT DOCUMENTS

2013/0079445 A1* 3/2013 Martin .................. C09C 1/3081
524/263
2013/0172446 A1 7/2013 Smale et al.

FOREIGN PATENT DOCUMENTS

WO 0210271 A1 2/2002
WO 2012031005 A2 3/2012
WO 2012092062 A1 7/2012

OTHER PUBLICATIONS

International Preliminary Report on Patentability and Written Opinion from international application No. PCT/US2015/051310, dated Mar. 28, 2017 (8 pages).
Gelest, "Silane Coupling Agents: Connecting Across Boundaries," copyright 2006.
International Search Report from international application No. PCT/US2015/051310, dated Dec. 31, 2015 (4 pages).

* cited by examiner

SILICA-CONTAINING RUBBER COMPOSITIONS CONTAINING SPECIFIED COUPLING AGENTS AND RELATED METHODS

CROSS-REFERENCE TO RELATED APPLICATIONS

This application is a continuation of U.S. application Ser. No. 15/513,835 filed Mar. 27, 2017 which claims priority to and benefit of PCT Application No. PCT/US2015/051310 filed Sep. 22, 2015 which claims priority to and any other benefit of U.S. Provisional Patent Application Ser. No. 62/054,816 Sep. 24, 2014, and entitled "Silica-Containing Rubber Compositions Containing Specified Coupling Agents and Related Methods," the entire disclosure of each of which is hereby incorporated by reference.

FIELD OF THE DISCLOSURE

The present disclosure relates to rubber compositions comprising a bi-functional silane coupling agent, and an unsaturated, non-sulfur silane coupling agent and to related methods. The present disclosure also relates to tire components containing the rubber compositions disclosed herein.

BACKGROUND

Rubber compositions for vehicles tires frequently use reinforcing fillers, such as silica, to impart desirable properties such as abrasion resistance and rolling resistance. However, silica fillers have the sometimes undesirable effect of increasing the electrical resistance of the rubber compositions into which they are incorporated.

SUMMARY OF THE INVENTION

Disclosed herein are rubber compositions comprising a bi-functional silane coupling agent and an unsaturated, non-sulfur silane coupling agent, and related methods. In certain embodiments disclosed herein, the rubber compositions can be described as having improved (i.e., reduced) electrical resistance. Also disclosed herein are tire components containing the rubber compositions disclosed herein.

In a first embodiment, a rubber composition comprising at least one conjugated diene-containing polymer, a reinforcing filler comprising silica or silica in combination with carbon black, a bi-functional silane coupling agent, and an unsaturated, non-sulfur silane coupling agent is disclosed. The rubber composition comprises 100 phr of the at least one conjugated diene-containing polymer, and about 50 to about 120 phr of the reinforcing filler. The bi-functional silane coupling agent and the unsaturated, non-sulfur silane coupling agent are present in amounts such that their (weight) ratio is from about 5:1 to about 20:1.

In a second embodiment, a method for preparing a rubber composition comprising at least one conjugated diene-containing polymer, a reinforcing filler comprising silica or silica in combination with carbon black, a bi-functional silane coupling agent, and an unsaturated, non-sulfur silane coupling agent is disclosed. The rubber composition comprises 100 phr of the at least one conjugated diene-containing polymer and about 50 to about 120 phr of the reinforcing filler. The bi-functional silane coupling agent and the unsaturated, non-sulfur silane coupling agent are present in amounts such that their (weight) ratio is from about 5:1 to about 20:1.

In a third embodiment, a method for reducing electrical resistance in a rubber composition is disclosed. The method comprises the use of a rubber composition as otherwise disclosed herein, i.e., comprising 100 phr of at least one conjugated diene-containing polymer, about 50 to about 120 phr of a reinforcing filler comprising silica or silica in combination with carbon black, a bi-functional silane coupling agent, and an unsaturated, non-sulfur silane coupling agent, where the bi-functional silane coupling agent and unsaturated, non-sulfur silane coupling agent are present in amounts such that their (weight) ratio is from about 5:1 to about 20:1.

Also disclosed herein, in a fourth embodiment, are tires and tire treads comprising the rubber composition as otherwise disclosed herein, i.e., comprising 100 phr of at least one conjugated diene-containing polymer, about 50 to about 120 phr of a reinforcing filler comprising silica or silica in combination with carbon black, a bi-functional silane coupling agent, and an unsaturated, non-sulfur silane coupling agent, where the bi-functional silane coupling agent and unsaturated, non-sulfur silane coupling agent are present in amounts such that their (weight) ratio is from about 5:1 to about 20:1.

DETAILED DESCRIPTION

Disclosed herein are rubber compositions comprising a bi-functional silane coupling agent and an unsaturated, non-sulfur silane coupling agent and related methods. In certain embodiments disclosed herein, the rubber compositions can be described as having improved (i.e., reduced) electrical resistance. Also disclosed herein are tire components containing the rubber compositions disclosed herein.

In a first embodiment, a rubber composition comprising at least one conjugated diene-containing polymer, a reinforcing filler comprising silica or silica in combination with carbon black, a bi-functional silane coupling agent, and an unsaturated, non-sulfur silane coupling agent is disclosed. The rubber composition comprises 100 phr of the at least one conjugated diene-containing polymer, and about 50 to about 120 phr of the reinforcing filler. The bi-functional silane coupling agent and the unsaturated, non-sulfur silane coupling agent are present in amounts such that their (weight) ratio is from about 5:1 to about 20:1.

In a second embodiment, a method for preparing a rubber composition comprising at least one conjugated diene-containing polymer, a reinforcing filler comprising silica or silica in combination with carbon black, a bi-functional silane coupling agent, and an unsaturated, non-sulfur silane coupling agent is disclosed. The rubber composition comprises 100 phr of the at least one conjugated diene-containing polymer and about 50 to about 120 phr of the reinforcing filler. The bi-functional silane coupling agent and the unsaturated, non-sulfur silane coupling agent are present in amounts such that their (weight) ratio is from about 5:1 to about 20:1.

In a third embodiment, a method for reducing electrical resistance in a rubber composition is disclosed. The method comprises the use of a rubber composition as otherwise disclosed herein, i.e., comprising 100 phr of at least one conjugated diene-containing polymer, about 50 to about 120 phr of a reinforcing filler comprising silica or silica in combination with carbon black, a bi-functional silane coupling agent, and an unsaturated, non-sulfur silane coupling agent, where the bi-functional silane coupling agent and unsaturated, non-sulfur silane coupling agent are present in amounts such that their (weight) ratio is from about 5:1 to about 20:1.

Also disclosed herein, in a fourth embodiment, are tires and tire treads comprising the rubber composition as otherwise disclosed herein, i.e., comprising 100 phr of at least one conjugated diene-containing polymer, about 50 to about 120 phr of a reinforcing filler comprising silica or silica in combination with carbon black, a bi-functional silane coupling agent, and an unsaturated, non-sulfur silane coupling agent, where the bi-functional silane coupling agent and unsaturated, non-sulfur silane coupling agent are present in amounts such that their (weight) ratio is from about 5:1 to about 20:1.

For the purpose of this disclosure, the term "phr" means the parts by weight per hundred parts of conjugated diene-containing polymer. If the rubber composition comprises more than one conjugated diene-containing polymer, "phr" means the parts by weight per hundred parts of the sum of all conjugated diene-containing polymers. For the purpose of this disclosure, any reference to a percent amount of a component in the rubber composition means a percent by weight, unless otherwise specified. Similarly, any reference to ratios of amounts of components in the rubber composition means the ratios by weight, unless otherwise specified. Unless stated to the contrary, discussions herein relating to the components and amounts of the rubber compositions of the present disclosure should be understood to apply equally to the other embodiments, e.g., the related methods and the tires (and tire treads) containing the rubber compositions disclosed herein.

Bi-Functional Silane Coupling Agent

As discussed above, according to the first-fourth embodiments, the rubber compositions comprise a bi-functional silane coupling agent. In certain embodiments according to the first-fourth embodiments disclosed herein, the bi-functional silane coupling agent comprises one compound, in accordance with the following descriptions. In other embodiments according to the first-fourth embodiments disclosed herein, the bi-functional silane coupling agent comprises more than one compound, i.e., two compounds, three compounds, or more, each in accordance with the following descriptions. For the purpose of the present disclosure, a bi-functional silane coupling agent can be understood to be a silica coupling agent having at least one moiety or functionality that is reactive with the surface of a silica filler particle, and at least one moiety or functionality that binds to the rubber polymer. In certain embodiments of the first-fourth embodiments, the at least one moiety or functionality that is reactive with the surface of a silica filler particle is a silica-containing moiety such as a silyl group or a silanol.

Broadly speaking, various types of bi-functional silane coupling agents are known and are suitable for use in various embodiments according to the first-fourth embodiments disclosed herein. In certain embodiments of the first-fourth embodiments, the bi-functional silane coupling agent contains sulfur. In certain embodiments of the first-fourth embodiments, the bi-functional silane coupling agent is selected from the group consisting of mercapto silane compounds, blocked mercapto silane compounds, monosulfide-based alkoxy-containing silane compounds, disulfide-based alkoxy-containing silane compounds, tetrasulfide-based alkoxy-containing silane compounds, and combinations thereof. Thus, it should be understood that in certain embodiments of the first-fourth embodiments disclosed herein, the rubber composition comprises more than one bi-functional silane coupling agent, i.e., from more than one of the foregoing groups. Bi-functional silane coupling agents are commercially available from, for example, Gelest Inc. (Morrisville, Pa.) and Dow Corning Corporation (Midland, Mich.).

In certain embodiments of the first-fourth embodiments disclosed herein, the bi-functional silane coupling agent is a mercapto silane. In certain embodiments of the first-fourth embodiments disclosed herein, mercapto silane compounds suitable for use in the rubber compositions can be described as having the general formula $HS-R^3-Si(X_n)(R^4_{3-n})$ where each X is independently selected from a halogen or an alkoxy group (if an alkoxy group, of the formula $OR^5$ where $R^5$ is a $C_1$ to $C_6$ aliphatic, cycloaliphatic or aromatic group); $R^3$ is selected from a $C_1$ to $C_4$ alkylene; each $R^4$ is independently selected from a $C_1$ to $C_{30}$ alkyl, $C_7$ to $C_{30}$ alkaryl, $C_5$ to $C_{30}$ cycloaliphatic or $C_6$ to $C_{20}$ aromatic; and n is an integer from 1 to 4. When X is a halogen, it can be selected from the group consisting of chlorine, bromine, iodine and fluorine, preferably chlorine. In certain embodiments of the first-fourth embodiments disclosed herein, the bi-functional silane coupling agent has the above formula and $R^3$ is selected from a $C_1$ to $C_3$ alkylene, X is an alkoxy group (with carbon portion of $C_1$ to $C_6$), and n is 3. In certain embodiments of the first-fourth embodiments disclosed herein, mixtures of various (i.e., more than one) mercapto silanes can be used in the rubber composition. In certain embodiments of the first-fourth embodiments disclosed herein, when the bi-functional silane coupling agent is a blocked mercapto silane, it is selected from the group consisting of 1-mercaptomethyltriethoxysilane, 2-mercaptoethyltriethoxysilane, 3-mercaptopropyltriethoxysilane, 3-mercaptopropylmethyldiethoxysilane, 2-mercaptoethyltriproxysilane, 18-mercaptooctadecyldiethoxychlorosilane, and combinations thereof.

In certain embodiments of the first-fourth embodiments disclosed herein, the bi-functional silane coupling agent is a blocked mercapto silane. In certain embodiments of the first-fourth embodiments disclosed herein, blocked mercapto silanes can be described as having the general formula $B-S-R^6-Si-X_3$ with a blocking group B that replaces the mercapto hydrogen atom to "block" the reaction of the sulfur atom with the polymer. In certain embodiments of the first-fourth embodiments disclosed herein where the bi-functional silane coupling agent is a blocked mercaptosilane with the foregoing general formula, B is a blocking group which can be in the form of an unsaturated heteroatom or carbon bound directly to sulfur via a single bond; $R^6$ is selected from a $C_1$ to $C_6$ linear or branched alkyl chain, and each X is independently selected from the group consisting of $C_1$ to $C_6$ alkyl, $C_1$ to $C_6$ alkoxy, halogen, halogen-containing $C_1$ to $C_6$ alkyl, and halogen-containing $C_1$ to $C_6$ alkoxy. Suitable blocked mercapto silanes for use in rubber compositions according to certain embodiments of the first-fourth embodiments disclosed herein, include, but are not limited to, those described in U.S. Pat. Nos. 6,127,468; 6,204,339; 6,528,673; 6,635,700; 6,649,684; 6,683,135; and 7,256,231. In certain embodiments of the first-fourth embodiments disclosed herein, when the bi-functional silane coupling agent is a blocked mercapto silane it is selected from the group consisting of 2-triethoxysilyl-1-ethylthioacetate; 2-trimethoxysilyl-1-ethylthioacetate; 2-(methyldimethoxy-silyl)-1-ethylthioacetate; 3-trimethoxysilyl-1-propylthioacetate; triethoxysilylmethyl-thioacetate; trimethoxysilylmethylthioacetate; triisopropoxysilylmethylthioacetate; methyldiethoxysilylmethylthioacetate; methyldimethoxysilylmethylthioacetate; methyldiiso-propoxysilylmethylthioacetate; dimethylethoxysilylmethylthioacetate; dimethylmethoxysilylmethylthioacetate; dimethylisopropoxysilylmethylthioacetate; 2-triisopropoxysilyl-1-ethylthioacetate; 2-(methyldiethoxysilyl)-1-ethylthioacetate, 2-(methyldiisopropoxysilyl)-1-ethylthioacetate; 2-(dimethylethoxysilyl-1-ethylthioacetate; 2-(dimethylmethoxysilyl)-1-ethylthioacetate; 2-(dimethylisopropoxysilyl)-1-ethylthioacetate; 3-triethoxysilyl-1-propyl-thioacetate; 3-triisopropoxysilyl-1-propylthioacetate; 3-methyldiethoxysilyl-1-propyl-thioacetate; 3-methyldimethoxysilyl-1-propylthioacetate; 3-methyldiisopropoxysilyl-1-propylthioacetate; 1-(2-triethoxysilyl-1-ethyl)-4-thioacetylcyclohexane; 1-(2-triethoxysilyl-1-ethyl)-3-thioacetylcyclohexane; 2-triethoxysilyl-5-thioacetylnorbornene; 2-triethoxysilyl-4-thioacetylnorbornene; 2-(2-triethoxysilyl-1-ethyl)-5-thioacetylnorbornene; 2-(2-triethoxy-silyl-1-ethyl)-4-thioacetylnorbornene; 1-(1-oxo-2-thia-5-triethoxysilylphenyl)benzoic acid; 6-triethoxysilyl-1-hexylthioacetate; 1-triethoxysilyl-5-hexylthioacetate; 8-triethoxysilyl-1-octylthioacetate; 1-triethoxysilyl-7-octylthioacetate; 6-triethoxysilyl-1-hexylthioacetate; 1-triethoxysilyl-5-octylthioacetate; 8-trimethoxysilyl-1-octylthioacetate; 1-trimethoxysilyl-7-octylthioacetate; 10-triethoxysilyl-1-decylthioacetate; 1-triethoxysilyl-9-decylthioacetate; 1-triethoxysilyl-2-butylthioacetate; 1-triethoxysilyl-3-butylthioacetate; 1-triethoxysilyl-3-methyl-2-butylthioacetate; 1-triethoxysilyl-3-methyl-3-butylthioacetate; 3-trimethoxysilyl-1-propylthiooctanoate; 3-triethoxysilyl-1-propyl-1-propylthiopalmitate; 3-triethoxysilyl-1-propylthiooctanoate; 3-triethoxysilyl-1-propylthiobenzoate; 3-triethoxysilyl-1-propylthio-2-ethylhexanoate; 3-methyldiacetoxysilyl-1-propylthioacetate; 3-triacetoxysilyl-1-propylthioacetate; 2-methyldiacetoxysilyl-1-ethylthioacetate; 2-triacetoxysilyl-1-ethylthioacetate; 1-methyldiacetoxysilyl-1-ethylthioacetate; 1-triacetoxysilyl-1-ethylthioacetate; tris-(3-triethoxysilyl-1-propyl)trithiophosphate; bis-(3-triethoxysilyl-1-propyl)methyldithiophosphonate; bis-(3-triethoxysilyl-1-propyl)ethyldithiophosphonate; 3-triethoxysilyl-1-propyldimethylthiophosphinate; 3-triethoxysilyl-1-propyldiethylthio-phosphinate; tris-(3-triethoxysilyl-1-propyl)tetrathiophosphate; bis-(3-triethoxysilyl-1propyl)methyltrithiophosphonate; bis-(3-triethoxysilyl-1-propyl)ethyltrithiophosphonate; 3-triethoxysilyl-1-propyldimethyldithiophosphinate; 3-triethoxysilyl-1-propyldiethyldithiophosphinate; tris-(3-methyldimethoxysilyl-1-propyl)trithiophosphate; bis-(3-methyl-dimethoxysilyl-1-propyl)methyldithiophosphonate; bis-(3-methyldimethoxysilyl-1-propyl)-ethyldithiophosphonate; 3-methyldimethoxysilyl-1-propyldimethylthiophosphinate; 3-methyldimethoxysilyl-1-propyldiethylthiophosphinate; 3-triethoxysilyl-1-propylmethyl-thiosulfate; 3-triethoxysilyl-1-propylmethanethiosulfonate; 3-triethoxysilyl-1-propyl-ethanethiosulfonate; 3-triethoxysilyl-1-propylbenzenethiosulfonate; 3-triethoxysilyl-1-propyltoluenethiosulfonate; 3-triethoxysilyl-1-propylnaphthalenethiosulfonate; 3-triethoxysilyl-1-propylxylenethiosulfonate; triethoxysilylmethylmethylthiosulfate; triethoxysilylmethylmethanethiosulfonate; triethoxysilylmethylethanethiosulfonate; triethoxysilylmethylbenzenethiosulfonate; triethoxysilylmethyltoluenethiosulfonate; triethoxysilylmethylnaphthalenethiosulfonate; triethoxysilylmethylxylenethiosulfonate, and the like. In certain embodiments of the first-fourth embodiments disclosed herein, mixtures of various (i.e., more than one) blocked mercaptosilanes can be used in the rubber composition.

In certain embodiments of the first-fourth embodiments disclosed herein, the bi-functional silane coupling agent is a monosulfide-based alkoxy-containing silane compound. In certain embodiments of the first-fourth embodiments disclosed herein, when the bi-functional silane coupling agent is a monosulfide-based alkoxy-containing compound it is selected from the group consisting of 3-octanoylthio-1-propyltriethoxysilane, 3-mercaptopropyltriethoxysilane, 1-mercaptomethyltriethoxysilane, 2-mercaptoethyltriethoxysilane, 3-mercaptopropylmethyldiethoxysilane, 2-mercaptoethyltriproproxysilane, 18-mercaptooctadecyldiethoxychlorosilane, and mixtures thereof.

In certain embodiments of the first-fourth embodiments disclosed herein, the bi-functional silane coupling agent is a disulfide-based alkoxy-containing silane compound. In certain embodiments of the first-fourth embodiments disclosed herein, when the bi-functional silane coupling agent is a disulfide-based alkoxy-containing silane compound it is selected from the group consisting of 3,3'-bis(triethoxysilylpropyl) disulfide, 3,3'-bis(trimethoxysilylpropyl) disulfide, 3,3'-bis(tributoxysilyl-propyl) disulfide, 3,3'-bis(tri-m-butoxysilyl-propyl) disulfide, 3,3'-bis(tripropoxypropyl) disulfide, 3,3'-bis(trihexoxysilylpropyl) disulfide, 2,2'-bis (dimethylmethoxysilylethyl) disulfide, 3,3'-bis(diphenylcyclohexoxysilylpropyl) disulfide, 3,3'-bis(ethyl-di-sec-butoxysilylpropyl) disulfide, 3,3'-bis(propyldiethoxysilylpropyl) disulfide, 3,3'-bis(triisopropoxysilylpropyl) disulfide, 12,12'-bis(triisopropoxysilylpropyl) disulfide, 3,3'-bis(dimethoxyphenylsilyl-2-methylpropyl) disulfide, and mixtures thereof.

In certain embodiments of the first-fourth embodiments disclosed herein, the bi-functional silane coupling agent is a tetrasulfide-based alkoxy-containing silane compound. In certain embodiments of the first-fourth embodiments disclosed herein, when the bi-functional silane coupling agent is a tetrasulfide-based alkoxy-containing silane compound it is selected from the group consisting of bis(3-triethoxysilylpropyl) tetrasulfide, bis(2-triethoxysilylethyl) tetrasulfide, bis(3-trimethoxysilylpropyl) tetrasulfide, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilyl-N,N-dimethylthiocarbamoyl tetrasulfide, 3-trimethoxysilylpropyl-benzothiazole tetrasulfide, 3-triethoxysilylpropylbenzothiazole tetrasulfide, and mixtures thereof.

Other specific examples of suitable bi-functional silane coupling agents for use in rubber compositions according to certain embodiments of the first-fourth embodiment disclosed herein are provided in U.S. Pat. No. 7,256,231 (the entire disclosure of which is hereby incorporated by reference) beginning at column 4, line 4.

As discussed above, according to the first-fourth embodiments disclosed herein the bi-functional silane is present in a larger amount than the unsaturated, non-sulfur silane coupling agent, i.e., a (weight) ratio of bi-functional silane to unsaturated, non-sulfur silane coupling agent if about 5/1 to about 20/1 (including 5/1 to 20/1). In certain embodiments according to the first-fourth embodiments disclosed herein, the (weight) ratio of bi-functional silane to unsaturated, non-sulfur silane coupling agent is about 5/1 to about 10/1 (including 5/1 to 10/1).

In certain embodiments according to the first-fourth embodiments disclosed herein, the rubber composition comprises about 1 to about 20 phr (including 1 to 20 phr) of a bi-functional silane coupling agent, including from about 2 to about 15 phr (including 2 to 15 phr), including from about 3 to about 10 phr (including 3 to 10 phr) of a bi-functional silane coupling agent. In certain embodiments according to the first-fourth embodiments disclosed herein, the rubber composition comprises at least about 1 phr, at least 1 phr, at least about 2 phr, at least 2 phr, at least about 3 phr, at least 3 phr, at least 5 phr, or at least about 5 phr of bi-functional silane coupling agent. In certain embodiments according to the first-fourth embodiments, the rubber comprises the bi-functional silane coupling agent in an amount of about 1% to about 20% (including 1 to 20%) by weight of silica filler. In certain embodiments according to the first-fourth embodiments disclosed herein, the rubber composition comprises bi-functional silane coupling agent in an amount of about 3 to about 10% (including 3 to 10%) by weight of silica filler.

Unsaturated, Non-Sulfur Silane Coupling Agent

As discussed above, according to the first-fourth embodiments disclosed herein, in addition to a bi-functional silane coupling agent, the rubber compositions also comprise an unsaturated, non-sulfur silane coupling agent. In certain embodiments according to the first-fourth embodiments disclosed herein, the unsaturated, non-sulfur silane coupling agent comprises one compound, in accordance with the following descriptions. In other embodiments according to the first-fourth embodiments disclosed herein, the unsaturated, non-sulfur silane coupling agent comprises more than one compound, i.e., two compounds, three compounds, or more, each in accordance with the following descriptions. For the purpose of the present disclosure, an unsaturated, non-sulfur silane coupling agent can be understood to have at least one organic R group with one or more double bonds between adjacent carbon atoms in the R group, a silane group, but no sulfur atoms in the atomic structure. In certain embodiments of the first-fourth embodiments disclosed herein, the R group of the unsaturated, non-sulfur silane coupling agent contains more than one double bond in a conjugated arrangement (e.g., —C=C—C=C—). Without being bound by theory, it is believed that the overlapping p orbitals present in a compound having at least one set of conjugated double bonds allows for improved electron transfer over the outer surface of the silica filler resulting in a reduction in the electrical resistance of a rubber composition containing the unsaturated, non-sulfur silane coupling agent as compared to a rubber composition having the same ingredients except for lacking the unsaturated, non-sulfur silane coupling agent. In certain embodiments of the first-fourth embodiments disclosed herein, the unsaturated, non-sulfur silane coupling agent comprises an unsaturated, conjugated, non-sulfur silane coupling agent which can be understood as an unsaturated, non-sulfur coupling agent having at least one set of conjugated double bonds.

Examples of unsaturated, non-sulfur silane coupling agents for use in the rubber compositions of certain embodiments according to the first-fourth embodiments disclosed herein include, but are not limited to, unsaturated alkyl alkoxysilanes. In certain embodiments according to the first-fourth embodiments disclosed herein, the unsaturated alkyl alkoxysilane has the general formula $(R^1L_m)_nSi(OR^2)_{4-n}$, where n is an integer from 1 to 4 and m is either 0 or 1. Generally, each $R^1$ independently comprises $C_1$ to $C_{20}$ unsaturated aliphatic, $C_5$ to $C_{20}$ unsaturated cycloaliphatic, or $C_6$ to $C_{20}$ aromatic; L is a divalent hydrocarbyl group having 0-5 carbon atoms (and in certain embodiments 3 carbon atoms); and each $R^2$ independently comprises $C_1$ to $C_6$ hydrocarbyl, preferably $C_1$ to $C_6$ aliphatic. Unsaturated alkyl alkoxysilane coupling agents are available from, for example, Gelest Inc. (Morrisville, Pa.) and Dow Corning Corporation (Midland, Mich.).

In certain embodiments of the first-fourth embodiments disclosed herein, the rubber composition comprises an unsaturated, non-sulfur silane coupling agent which is an unsaturated alkyl alkoxysilane having the general formula $(R^1L_m)_nSi(OR^2)_{4-n}$, wherein n is an integer from 1 to 4 and m is 0 or 1. In certain embodiments according to the first-fourth embodiments disclosed herein, the unsaturated, non-sulfur silane coupling agent has the foregoing general formula, and n equals 1. According to the foregoing general formula, each $R^1$ is independently selected from: (i) alkenyl groups having 2-8 carbon atoms; (ii) cycloalkenyl groups having 3-8 carbon atoms; (iii) alkynyl groups having 2-8 carbon atoms; (iv) aryl groups having 6-14 carbon atoms; (v) aralkyl groups having 6-14 carbon atoms; and (vi) heteroaryl groups having 3-14 carbon atoms but not containing sulfur, wherein each of (i)-(v) optionally includes one or more heteroatoms excluding sulfur. According to the foregoing general formula, L is a linker group comprising a divalent hydrocarbyl chain having 0-5 carbon atoms (and in certain embodiments 3 carbon atoms). The linker group L acts to separate the unsaturated group from the silyl group in the unsaturated, non-sulfur silane coupling agent, reducing the steric hindrance between the unsaturated functional group of the silane and the surface of the silica substrate. Further according to the foregoing general formula, each $R^2$ independently comprises hydrocarbyl groups having 1 to 6 carbon atoms. In certain embodiments according to the first-fourth embodiments disclosed herein, the unsaturated, non-sulfur silane coupling agent has the foregoing general formula and each $R^2$ group independently comprises hydrocarbyl groups having 1 to 3 carbon atoms. In certain embodiments according to the first-fourth embodiments disclosed herein, the unsaturated, non-sulfur silane coupling agent has the foregoing general formula wherein n=1 and each $R^2$ group independently comprises hydrocarbyl groups having 1 to 3 carbon atoms.

In certain embodiments of the first-fourth embodiments disclosed herein, the rubber composition comprises an unsaturated, non-sulfur silane coupling agent having the foregoing general formula and each $R^1$ of the unsaturated, non-sulfur silane coupling agent independently and optionally includes one or more heteroatoms, excluding sulfur. Nonlimiting examples of the one or more optional heteroatoms in $R^1$ include nitrogen, oxygen, chlorine, bromine, iodine, fluorine, phosphorus, and combinations thereof. In preferred embodiments according to the first-fourth embodiments, the one or more optional heteroatoms in $R^1$ are selected from the group consisting of nitrogen, oxygen, and combinations thereof.

In certain embodiments of the first-fourth embodiments disclosed herein, the rubber composition comprises an unsaturated, non-sulfur silane coupling agent selected from the group consisting of alkenyl alkoxysilanes, cycloalkenyl alkoxysilanes, alkynyl alkoxysilanes, aryl alkoxysilanes, aralkyl alkoxysilanes, heteroaryl alkoxysilanes, unsaturated alkoxysilanes containing heteroatoms, and mixtures thereof.

Non-limiting examples of suitable unsaturated, non-sulfur silane coupling agents suitable for use in the rubber compositions of certain embodiments according to the first-fourth embodiments disclosed herein are alkenyl alkoxysilanes including, but not limited to, vinyltrimethoxysilane, vinyltriethoxysilane, vinyltripropoxysilane, vinyltributoxysilane, vinyltripentoxysilane, vinyltrihexoxysilane, allyltrimethoxysilane, allyltriethoxysilane, allyltripropoxysilane, allyltributoxysilane, allyltripentoxysilane, allyltrihexoxysilane, propenyltrimethoxysilane, propenyltriethoxysilane, propenyltripropoxysilane, propenyltributoxysilane, propenyltripentoxysilane, propenyltrihexoxysilane, butenyltrimethoxysilane, butenyltriethoxysilane, butenyltripropoxysilane, butenyltributoxysilane, butenyltripentoxysilane, butenyltrihexoxysilane, butadienyltrimethoxysilane, butadienyltriethoxysilane, butadienyltripropoxysilane, butadienyltributoxysilane, butadienyltripentoxysilane, butadienyltrihexoxysilane, pentenyltrimethoxysilane, pentenyltriethoxysilane, pentenyltripropoxysilane, pentenyltributoxysilane, pentenyltripentoxysilane, pentenyltrihexoxysilane, pentadienyltrimethoxysilane, pentadienyltriethoxysilane, pentadienyltripropoxysilane, pentadienyltributoxysilane, pentadienyltripentoxysilane, pentadienyltrihexoxysilane, hexenyltrimethoxysilane, hexenyltriethoxysilane, hexenyltripropoxysilane, hexenyltributoxysilane, hexenyltripentoxysilane, hexenyltrihexoxysilane, hexadienyltrimethoxysilane, hexadienyltriethoxysilane, hexadienyltripropoxysilane, hexadienyltributoxysilane, hexadienyltripentoxysilane, hexadienyltrihexoxysilane, hexatrienyltrimethoxysilane, hexatrienyltriethoxysilane, hexatrienyltripropoxysilane, hexatrienyltributoxysilane, hexatrienyltripentoxysilane, hexatrienyltrihexoxysilane, heptenyltrimethoxysilane, heptenyltriethoxysilane, heptenyltripropoxysilane, heptenyltributoxysilane, heptenyltripentoxysilane, heptenyltrihexoxysilane, heptadienyltrimethoxysilane, heptadienyltriethoxysilane, heptadienyltripropoxysilane, heptadienyltributoxysilane, heptadienyltripentoxysilane, heptadienyltrihexoxysilane, heptatrienyltrimethoxysilane, heptatrienyltriethoxysilane, heptatrienyltripropoxysilane, heptatrienyltributoxysilane, heptatrienyltripentoxysilane, heptatrienyltrihexoxysilane, octenyltrimethoxysilane, octenyltriethoxysilane, octenyltripropoxysilane, octenyltributoxysilane, octenyltripentoxysilane, octenyltrihexoxysilane, octadienyltrimethoxysilane, octadienyltriethoxysilane, octadienyltripropoxysilane, octadienyltributoxysilane, octadienyltripentoxysilane, octadienyltrihexoxysilane, octatrienyltrimethoxysilane, octatrienyltriethoxysilane, octatrienyltripropoxysilane, octatrienyltributoxysilane, octatrienyltripentoxysilane, octatrienyltrihexoxysilane, octatetraenyltrimethoxy silane, octatetraenyltriethoxysilane, octatetraenyltripropoxysilane, octatetraenyltributoxysilane, octatetraenyltripentoxysilane, octatetraenyltrihexoxysilane and mixtures thereof.

Non-limiting examples of suitable unsaturated, non-sulfur silane coupling agents suitable for use in the rubber compositions of certain embodiments of the first-fourth embodiments disclosed herein, are cycloalkenyl alkoxysilanes including, but not limited to, cyclopropenyltrimethoxysilane, cyclopropenyltriethoxysilane, cyclopropenyltripropoxysilane, cyclopropenyltributoxysilane, cyclopropenyltripentoxysilane, cyclopropenyltrihexoxysilane, cyclobutenyltrimethoxysilane, cyclobutenyltriethoxysilane, cyclobutenyltripropoxysilane, cyclobutenyltributoxysilane, cyclobutenyltripentoxysilane, cyclobutenyltrihexoxysilane, cyclopentenyltrimethoxysilane, cyclopentenyltriethoxysilane, cyclopentenyltripropoxysilane, cyclopentenyltributoxysilane, cyclopentenyltripentoxysilane, cyclopentenyltrihexoxysilane, cyclopentadienyltrimethoxysilane, cyclopentadienyltriethoxysilane, cyclopentadienyltripropoxysilane, cyclopentadienyltributoxysilane, cyclopentadienyltripentoxysilane, cyclopentadienyltrihexoxysilane, cyclohexenyltrimethoxysilane, cyclohexenyltriethoxysilane, cyclohexenyltripropoxysilane, cyclohexenyltributoxysilane, cyclohexenyltripentoxysilane, cyclohexenyltrihexoxysilane, cyclohexadienyltrimethoxysilane, cyclohexadienyltriethoxysilane, cyclohexadienyltripropoxysilane, cyclohexadienyltributoxysilane, cyclohexadienyltripentoxysilane, hexadienyltripentoxysilane, cyclohexadienyltrihexoxysilane, cycloheptenyltrimethoxysilane, cycloheptenyltriethoxysilane, cycloheptenyltripropoxysilane, cycloheptenyltributoxysilane, cycloheptenyltripentoxysilane, cycloheptenyltrihexoxysilane, cycloheptadienyltrimethoxysilane, cycloheptadienyltriethoxysilane, cycloheptadienyltripropoxysilane, cycloheptadienyltributoxysilane, cycloheptadienyltripentoxysilane, cycloheptadienyltrihexoxysilane, cyclooctenyltrimethoxysilane, cyclooctenyltriethoxysilane, cyclooctenyltripropoxysilane, cyclooctenyltributoxysilane, cyclooctenyltripentoxysilane, cyclooctenyltrihexoxysilane, cyclooctadienyltrimethoxysilane, cyclooctadienyltriethoxysilane, cyclooctadienyltripropoxysilane, cyclooctadienyltributoxysilane, cyclooctadienyltripentoxysilane, cyclooctadienyltrihexoxysilane, cyclooctatrienyltrimethoxysilane, cyclooctatrienyltriethoxysilane, cyclooctatrienyltripropoxysilane, cyclooctatrienyltributoxysilane, cyclooctatrienyltripentoxysilane, cyclooctatrienyltrihexoxysilane, cyclooctatetraenyltrimethoxysilane, cyclooctatetraenyltriethoxysilane, cyclooctatetraenyltripropoxysilane, cyclooctatetraenyltributoxysilane, cyclooctatetraenyltripentoxysilane, cyclooctatetraenyltrihexoxysilane, and mixtures thereof.

Non-limiting examples of suitable unsaturated, non-sulfur silane coupling agents suitable for use in the rubber compositions of certain embodiments of the first-fourth embodiments disclosed herein, are alkynyl alkoxysilanes including, but not limited to, ethynyltrimethoxysilane, ethynyltriethoxysilane, ethynyltripropoxysilane, ethynyltributoxysilane, ethynyltripentoxysilane, ethynyltrihexoxysilane, propynyltrimethoxysilane, propynyltriethoxysilane, propynyltripropoxysilane, propynyltributoxysilane, butynyltrimethoxysilane, butynyltriethoxysilane, pentynyltrimethoxysilane, pentynyltriethoxysilane, hexynyltrimethoxysilane, hexynyltriethoxysilane, heptynyltrimethoxysilane, heptynyltriethoxysilane, octynyltrimethoxysilane, octynyltriethoxysilane, and mixtures thereof.

Non-limiting examples of suitable unsaturated, non-sulfur silane coupling agents suitable for use in the rubber compositions of certain embodiments of the first-fourth embodiments disclosed herein, are aryl alkoxysilanes or aralkyl alkoxysilanes including, but not limited to, phenyltrimethoxysilane, phenyltriethoxysilane, phenyltripropoxysilane, phenyltributoxysilane, phenyltripentoxysilane, phenyltrihexoxysilane, benzyltrimethoxysilane, benzyltriethoxysilane, benzyltripropoxysilane, benzyltributoxysilane, benzyltripentoxysilane, benzyltrihexoxysilane, styryltrimethoxysilane, styryltriethoxysilane, styryltripropoxysilane, styryltributoxysilane, styryltripentoxysilane, styryltrihexoxysilane, naphthyltrimethoxysilane, naphthyltriethoxysilane, anthryltrimethoxysilane, anthryltriethoxysilane, and mixtures thereof.

Non-limiting examples of suitable unsaturated, non-sulfur silane coupling agents suitable for use in the rubber compositions of certain embodiments of the first-fourth embodiments disclosed herein, are heteroaryl alkoxysilanes including, but not limited to, trimethoxysilylpyrrole, triethoxysilylpyrrole, tripropoxysilylypyrrole, trimethoxysilylimidazole, trimethoxysilylpyridine, triethoxysilylpyridine, trimethoxysilylfuran, triethoxysilylfuran, and mixtures thereof.

Non-limiting examples of suitable unsaturated, non-sulfur silane coupling agents suitable for use in the rubber compositions of certain embodiments of the first-fourth embodiments disclosed herein, are unsaturated alkoxysilanes containing heteroatoms including, but not limited to, methacryloxymethyltrimethoxysilane, methacryloxypropyltrimethoxysilane, methacryloxymethyltriethoxysilane, m-aminophenyltrimethoxysilane, p-aminophenyltrimethoxysilane, m-aminophenoxypropyltrimethoxysilane, n-phenylaminomethyltrimethoxysilane, n-phenylaminomethyltriethoxysilane, n-phenylaminoethyltrimethoxysilane, n-phenylaminopropyltrimethoxysilane, benzoyloxypropyltrimethoxysilane, p-chloromethylphenyltrimethoxysilane, diphenylphosphinoethyltriethoxysilane, and mixtures thereof.

In certain embodiments of the first-fourth embodiments disclosed herein, the rubber composition comprises an unsaturated, non-sulfur silane coupling agent in an amount of about 0.05 to 4 phr. In certain embodiments of the first-fourth embodiments disclosed herein, the unsaturated, non-sulfur silane coupling agent is utilized in an amount of 0.3 to 2.5 phr or 0.6 to 1.5 phr. In certain embodiments of the first-fourth embodiments disclosed herein, the unsaturated, non-sulfur silane coupling agent is utilized in an amount of about 0.05% to 4% by weight of silica filler. In other embodiments, the unsaturated, non-sulfur silane coupling agent is utilized in an amount of about 0.07 to 2.5%, 0.1 to 1% or 0.3 to 0.8% by weight of silica filler.

Other Components of Rubber Composition

As discussed above, according to the first-fourth embodiments disclosed herein, the rubber composition comprises at least one conjugated diene-containing polymer. The word polymer in the phrase conjugated diene-containing polymer is intended to include both polymers and copolymers. In certain embodiments of the first-fourth embodiments disclosed herein, the at least one conjugated diene-containing polymer may be a polymer, a copolymer, or a combination thereof (i.e., more than one polymer, more than one copolymer, one polymer and one copolymer, more than one polymer and one copolymer, more than one copolymer and one polymer, or more than one copolymer and more than one polymer) when more than one conjugated diene-containing polymer is utilized. Examples of suitable conjugated diene monomers that can be contained with the at least one conjugated diene-containing polymer according to certain embodiments of the first-fourth embodiments disclosed herein include, but are not limited to, 1,3 butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, 2,4-hexadiene, 1,3-cyclopentadiene, 1,3-cyclohexadiene, 1,3-cycloheptadiene, and 1,3-cyclooctadiene, and derivatives thereof. It should be understood that mixtures of two or more conjugated dienes may be utilized in certain embodiments. Non-limiting examples of suitable polymers for use as the at least one conjugated diene-containing polymer according to certain embodiments of the first-fourth embodiments disclosed herein include, but are not limited to, polybutadiene, styrene-butadiene rubber, styrene-isoprene rubber, styrene-butadiene-isoprene rubber, natural rubber, polyisoprene, and combination thereof. As used herein, the term polyisoprene is intended to describe a homopolymer comprised of isoprene monomer and is not intended to encompass copolymers merely containing some isoprene monomer along with other monomer(s). As used herein, the term polybutadiene is intended to describe a homopolymer comprised of butadiene monomer and is not intended to encompass copolymers merely containing some butadiene monomer along with other monomer(s). As used herein, the phrase conjugated diene-containing is intended to describe polymers that contain at least one type of conjugated diene monomer.

In certain embodiments according to the first-fourth embodiments disclosed herein, the at least one conjugated diene-containing polymer of the rubber composition may comprise a functionalized polymer. In certain such embodiments, the rubber composition comprises 5 to 100 phr of at least one functionalized polymer, including 10 to 90 phr, 10 to 70 phr, and 10 to 50 phr. In certain embodiments according to the first-fourth embodiments disclosed herein, the functionalized polymer comprises a polymer with a silica-reactive functional group. Non-limiting examples of silica-reactive functional groups that are known to be utilized in functionalizing conjugated diene polymers and are suitable for use in the rubber compositions of certain embodiments of the first-fourth embodiments disclosed herein include nitrogen-containing functional groups, silicon-containing functional groups, oxygen or sulfur-containing functional groups, and metal-containing functional group. As used herein, the term functionalized polymer should be understood to include polymers with a functional group at one or both terminus (e.g., from use of a functionalized initiator, a functionalized terminator, or both), a functional group in the main chain of the polymer, and combinations thereof. For example, a silica-reactive functionalized polymer may have the functional group at one or both terminus, in the main chain thereof, or both.

Non-limiting examples of nitrogen-containing functional groups that are known to be utilized in functionalizing conjugated diene-containing polymers include, but are not limited to, any of a substituted or unsubstituted amino group, an amide residue, an isocyanate group, an imidazolyl group, an indolyl group, a nitrile group, a pyridyl group, and a ketimine group. The foregoing substituted or unsubstituted amino group should be understood to include a primary alkylamine, a secondary alkylamine, or a cyclic amine, and an amino group derived from a substituted or unsubstituted imine. In certain embodiments according to the first-fourth embodiments disclosed herein, the rubber composition comprises a functionalized conjugated diene-containing polymer having at least one functional group selected from the foregoing list.

Non-limiting examples of silicon-containing functional groups that are known to be utilized in functionalizing conjugated diene-containing polymers include, but are not limited to, an organic silyl or siloxy group, and more precisely, the functional group may be selected from an alkoxysilyl group, an alkylhalosilyl group, a siloxy group, an alkylaminosilyl group, and an alkoxyhalosilyl group. Suitable silicon-containing functional groups for use in functionalizing conjugated diene-containing polymers also include those disclosed in U.S. Pat. No. 6,369,167, the entire disclosure of which is hereby incorporated by reference. In certain embodiments according to the first-fourth embodiments disclosed herein, the rubber composition comprises a functionalized conjugated diene-containing polymer having at least one functional group selected from the foregoing list.

Non-limiting examples of oxygen or sulfur-containing functional groups that are known to be utilized in functionalizing conjugated diene-containing polymers include, but are not limited to, a hydroxyl group, a carboxyl group, an epoxy group, a glycidoxy group, a diglycidylamino group, a cyclic dithiane-derived functional group, an ester group, an aldehyde group, an alkoxy group, a ketone group, a thiocarboxyl group, a thioepoxy group, a thioglycidoxy group, a thiodiglycidylamino group, a thioester group, a thioaldehyde group, a thioalkoxy group and a thioketone group. In certain embodiments, the foregoing alkoxy group may be an alcohol-derived alkoxy group derived from a benzophenone.

In certain embodiments according to the first-fourth embodiments disclosed herein, the rubber composition comprises a functionalized conjugated diene-containing polymer having at least one functional group selected from the foregoing list.

Generally, conjugated diene-containing polymers may be prepared and recovered according to various suitable methods such as batch, semi-continuous, or continuous operations, as are well known to those having skill in the art. The polymerization can also be carried out in a number of different polymerization reactor systems, including but not limited to bulk polymerization, vapor phase polymerization, solution polymerization, suspension polymerization, coordination polymerization, and emulsion polymerization. The polymerization may be carried out using a free radical mechanism, an anionic mechanism, a cationic mechanism, or a coordination mechanism. All of the above polymerization methods are well known to persons skilled in the art. However, for exemplary purposes, a short description of polymerization via an anionic mechanism is given.

When conjugated diene-containing polymers are produced through anionic polymerization, an organic alkaline metal compound, preferably a lithium-containing compound, is typically used as a polymerization initiator. Examples of lithium-containing compounds used as polymerization initiators include, but are not limited to, hydrocarbyl lithium compounds, lithium amide compounds, and similar lithium compounds. The amount of the lithium compound used as the polymerization initiator is preferably within a range of 0.2 to 20 millimoles per 100 g of the monomer.

Non-limiting examples of hydrocarbyl lithium compounds include ethyl lithium, n-propyl lithium, isopropyl lithium, n-butyl lithium, sec-butyl lithium, tert-octyl lithium, n-decyl lithium, phenyl lithium, 2-naphthyl lithium, 2-butyl-phenyl lithium, 4-phenyl-butyl lithium, cyclohexyl lithium, cyclopentyl lithium, a reaction product of diisopropenylbenzene and butyl lithium, and mixtures thereof. Among these, alkyl lithium compounds such as ethyl lithium, n-propyl lithium, isopropyl lithium, n-butyl lithium, sec-butyl lithium, tert-octyl lithium, n-decyl lithium and so on are preferable, and n-butyl lithium is particularly preferable.

Methods for producing conjugated diene-containing polymers through anionic polymerization using an organic alkaline metal compound as the polymerization initiator are not particularly limited. For example, a conjugated diene-containing polymer can be produced by polymerizing the conjugated diene monomer alone or a mixture of the conjugated diene monomer and aromatic vinyl compound in a hydrocarbon solvent inactive to the polymerization reaction. Non-limiting examples of the hydrocarbon solvent inactive to the polymerization reaction include propane, n-butane, isobutane, n-pentane, isopentane, n-hexane, cyclohexane, propene, 1-butene, isobutene, trans-2-butene, cis-2-butene, 1-pentene, 2-pentene, 1-hexene, 2-hexene, benzene, toluene, xylene, ethylbenzene and mixtures thereof.

The anionic polymerization may be carried out in the presence of a randomizer. The randomizer can control the microstructure of the conjugated diene compound, and has an action that 1,2-bond content in butadiene unit of the polymer using, for example, butadiene as a monomer is controlled, and butadiene unit and styrene unit in the copolymer using butadiene and styrene as a monomer are randomized, or the like. Non-limiting examples of the randomizer include dimethoxybenzene, tetrahydrofuran, dimethoxyethane, diethylene glycol dibutyl ether, diethylene glycol dimethyl ether, bis tetrahydrofuryl propane, triethylamine, pyridine, N-methylmorpholine, N,N,N',N'-tetramethyl ethylenediamine, 1,2-dipiperidinoethane, potassium-t-amylate, potassium-t-butoxide, sodium-t-amylate and so on. The amount of the randomizer used is preferably within a range of 0.01 to 100 molar equivalent per 1 mole of the organic alkaline metal compound as a polymerization initiator.

The anionic polymerization may be carried out through any of solution polymerization, vapor phase polymerization and bulk polymerization. In the solution polymerization, the concentration of the monomer in the solution is preferably within a range of 5 to 50% by mass, more preferably 10 to 30% by mass. When the conjugated diene monomer and a vinyl aromatic monomer are used together, the content of the vinyl aromatic monomer in the mixture is preferably within a range of 3 to 50% by mass, more preferably 4 to 45% by mass. Also, the polymerization system is not particularly limited and may be a batch system or a continuous system.

The polymerization temperature in the anionic polymerization is preferably within a range of 0 to 150° C., more preferably 20 to 130° C. The polymerization may be carried out under a generating pressure or, preferably, at a pressure sufficient to keep the reaction monomers substantially in a liquid phase. When the polymerization reaction is carried out under a pressure higher than the generating pressure, the reaction system is preferably pressurized with an inert gas. Preferably, any reaction-obstructing substances, such as water, oxygen, carbon dioxide, protonic compounds, and the like are removed before beginning the polymerization reaction.

Typically, in the rubber compositions disclosed herein, the overall composition contains 100 phr (in total) of conjugated diene-containing polymer(s). In other words, the total amount of all conjugated diene-containing polymer is considered to be 100 parts (by weight) and denoted 100 phr. Other components are added based upon 100 parts (in total) of conjugated diene-containing polymer(s). As a non-limiting example, 60 parts of styrene-butadiene copolymer could be utilized along with 40 parts of 1,3-butadiene polymer and 60 parts of silica; these amounts would be described herein as 60 phr of styrene-butadiene copolymer, 40 parts of 1,3-butadiene polymer and 60 phr of silica.

As discussed above, according to the first-fourth embodiments, the rubber compositions disclosed herein comprise about 50 to about 120 phr (including 50 to 120 phr) of at least one reinforcing filler comprising silica or silica in combination with carbon black. Suitable silica fillers for use in the rubber composition are well known. Non-limiting examples of silica fillers suitable for use in the rubber compositions of certain embodiments of the first-fourth embodiments disclosed herein include, but are not limited to, precipitated amorphous silica, wet silica (hydrated silicic acid), dry silica (anhydrous silicic acid), fumed silica, calcium silicate and the like. Other suitable fillers for use in rubber compositions of certain embodiments of the first-fourth embodiments disclosed herein include, but are not limited to, aluminum silicate, magnesium silicate, and the like. Among the listed silica fillers, precipitated amorphous wet-process, hydrated silica fillers are preferred. Such silica fillers are produced by a chemical reaction in water, from which they are precipitated as ultrafine, spherical particles, with primary particles strongly associated into aggregates, which in turn combine less strongly into agglomerates. The surface area, as measured by the BET method, is a preferred measurement for characterizing the reinforcing character of different silica fillers. In certain embodiments of the first-fourth embodiments disclosed herein, the rubber composition comprises a silica filler having a surface area (as measured by the BET method) of about 32 m$^2$/g to about 400 m$^2$/g (including 32 to 400 m$^2$/g), with the range of about 100 m$^2$/g to about 250 m$^2$/g (including 100 to 250 m$^2$/g) being preferred, and the range of about 150 m$^2$/g to about 220 m$^2$/g (including 150 to 220 m$^2$/g) being most preferred. In certain embodiments of the first-fourth embodiments disclosed herein, the rubber composition comprises silica filler having a pH of about 5.5 to about 7 (including 5.5 to 7) or slightly over 7, preferably about 5.5 to about 6.8 (including 5.5 to 6.8). As used herein, the term "reinforcing" as used with respect to "reinforcing carbon black filler," "reinforcing silica filler," and "reinforcing fillers" generally should be understood to encompass both fillers that are traditionally described as reinforcing as well as fillers that may be described as semi-reinforcing. Traditionally, the term "reinforcing filler" is used to refer to a particulate material that has a nitrogen absorption specific surface area (N$_2$SA) of more than about 100 m$^2$/g, and in certain instances more than 100 m$^2$/g, more than about 125 m$^2$/g, more than 125 m$^2$/g, or even more than about 150 m$^2$/g or more than 150 m$^2$/g. Alternatively, the traditional use of the term "reinforcing filler" can also be used to refer to a particulate material that has a particle size of about 10 nm to about 50 nm (including 10 nm to 50 nm). Traditionally, the term "semi-reinforcing filler" is used to refer to a filler that is intermediary in either particle size, surface area (N$_2$SA), or both, to a non-reinforcing filler and a reinforcing filler. In certain embodiments of the first-fourth embodiments disclosed herein, the term "reinforcing filler" is used to refer to a particulate material that has a nitrogen absorption specific surface area (N$_2$SA) of about 20 m$^2$/g or greater, including 20 m$^2$/g or greater, more than about 50 m$^2$/g, more than 50 m$^2$/g, more than about 100 m$^2$/g, more than 100 m$^2$/g, more than about 125 m$^2$/g, and more than 125 m$^2$/g. In certain embodiments of the first-fourth embodiments disclosed herein, the term "reinforcing filler" is additionally or alternatively used to refer to a particulate material that has a particle size of about 10 nm up to about 1000 nm, including 10 nm up to 1000 nm, about 10 nm up to about 50 nm, and 10 nm up to 50 nm. In certain embodiments of the first-fourth embodiments, the term "non-reinforcing filler" is used to refer to a particulate material that has a nitrogen absorption specific surface area (N$_2$SA) of less than about 20 m$^2$/g (including less than 20 m$^2$/g), and in certain embodiments less than about 10 m$^2$/g (including less than 10 m$^2$/g). The N$_2$SA surface area of a particulate material can be determined according to various standard methods including ASTM D6556. In certain embodiments of the compositions and methods disclosed herein, the term "non-reinforcing filler" is additionally or alternatively used to refer to a particulate material that has a particle size of greater than about 1000 nm (including less than 1000 nm).

In certain embodiments of the first-fourth embodiments disclosed herein, the rubber composition comprises a silica filler can be employed in the amount of about 25 to about 150 phr (including 25 to 150 phr), including about 35 to about 150 phr (including 35 to 150 phr), about 40 to about 125 phr (including 40 to 125 phr), about 40 to about 100 phr (including 40 to 100 phr), about 40 to about 80 phr (including 40 to 80 phr), about 50 to about 120 phr (including 50 to 120 phr), about 50 to about 100 phr (including 50 to 100 phr), and about 50 to about 80 phr (including 50 to 80 phr). In certain embodiments, the useful upper range for the amount of silica filler can be considered to be somewhat limited by the high viscosity imparted by fillers of this type. Some of the commercially available silica fillers which can be used in the rubber compositions of certain embodiments of the first-fourth embodiments disclosed herein include, but are not limited to, Hi-Sil®190, Hi-Sil®210, Hi-Sil®215, Hi-Sil®233, Hi-Sil®243, and the like, produced by PPG Industries (Pittsburgh, Pa.). As well, a number of useful commercial grades of different silica fillers are also available from Degussa Corporation (e.g., VN2, VN3), Rhone Poulenc (e.g., Zeosil™ 1165MP), and J. M. Huber Corporation.

In certain embodiments of the first-fourth embodiments disclosed herein, the at least one reinforcing filler may optionally include one or more carbon blacks. In other words, carbon black is not considered to be an essential component of the rubber compositions in all embodiments of the first-fourth embodiments disclosed herein. In certain embodiments of the first-fourth embodiments disclosed herein, the at least one reinforcing filler comprises carbon black in an amount of from zero to about 50% (including zero to 50%) by weight of the total reinforcing filler, including about 5% to about 30% (including 5 to 30%), from about 5% to about 20% (including 5 to 20%), from about 10% to about 30% (including 10 to 30%), and about 10% to about 20% (including 10 to 20%) by weight of the total reinforcing filler. In certain embodiments of the first-fourth embodiments disclosed herein, the carbon black comprises no more than about 30% (including no more than 30%) by weight of the total reinforcing filler in the rubber composition. Generally, suitable carbon black for use in the rubber composition of certain embodiments of the first-fourth embodiments disclosed herein includes any of the commonly available, commercially-produced carbon blacks, including those having a surface area of at least about 20 m$^2$/g and, more preferably, at least about 35 m$^2$/g up to about 200 m$^2$/g or higher. Surface area values used in this application are determined by ASTM D-1765 using the cetyltrimethyl-ammonium bromide (CTAB) technique. Among the useful carbon blacks are furnace black, channel blacks, and lamp blacks. More specifically, examples of useful carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which can be utilized include acetylene blacks. In certain embodiments of the first-fourth embodiments disclosed herein, the rubber composition includes a mixture of two or more of the foregoing blacks. Typical suitable carbon blacks for use in certain embodiments of the first-fourth embodiments disclosed herein are N-110, N-220, N-339, N-330, N-351, N-550, and N-660, as designated by ASTM D-1765-82a. The carbon blacks utilized can be in pelletized form or an unpelletized flocculent mass. Preferably, for more uniform mixing, unpelletized carbon black is preferred.

In certain embodiments of the first-fourth embodiments, the at least one reinforcing filler includes a reinforcing filler in addition to silica and the optional carbon black, non-limiting examples of which include, but are not limited to, alumina, aluminum hydroxide, clay, magnesium hydroxide, boron nitride, aluminum nitride, titanium dioxide, reinforcing zinc oxide, and combinations thereof.

In certain embodiments of the first-fourth embodiments, the rubber composition includes a cure package. Generally, the cure package includes at least one of: a vulcanizing agent; a vulcanizing accelerator; a vulcanizing activator (e.g., zinc oxide, stearic acid, and the like); a vulcanizing inhibitor, and an anti-scorching agent. In certain embodiments, the cure package includes at least one vulcanizing agent, at least one vulcanizing accelerator, at least one vulcanizing activator and optionally a vulcanizing inhibitor and/or an anti-scorching agent. Vulcanizing accelerators and vulcanizing activators act as catalysts for the vulcanization agent. Vulcanizing inhibitors and anti-scorching agents are known in the art and can be selected by one skilled in the art based on the vulcanizate properties desired.

Examples of suitable types of vulcanizing agents for use in the rubber compositions according to certain embodiments of the first-fourth embodiments, include but are not limited to, sulfur or peroxide-based curing components. Thus, in certain such embodiments, the curative component includes a sulfur-based curative or a peroxide-based curative. Examples of specific suitable sulfur vulcanizing agents include "rubbermaker's" soluble sulfur; sulfur donating curing agents, such as an amine disulfide, polymeric polysulfide, or sulfur olefin adducts; and insoluble polymeric sulfur. In certain embodiments, the sulfur vulcanizing agent is soluble sulfur or a mixture of soluble and insoluble polymeric sulfur. For a general disclosure of suitable vulcanizing agents and other components used in curing, e.g., vulcanizing inhibitor and anti-scorching agents, one can refer to Kirk-Othmer, Encyclopedia of Chemical Technology, 3rd ed., Wiley Interscience, N.Y. 1982, Vol. 20, pp. 365 to 468, particularly Vulcanization Agents and Auxiliary Materials, pp. 390 to 402, or Vulcanization by A. Y. Coran, Encyclopedia of Polymer Science and Engineering, Second Edition (1989 John Wiley & Sons, Inc.), both of which are incorporated herein by reference. Vulcanizing agents can be used alone or in combination. Generally, the vulcanizing agents are used in an amount ranging from 0.1 to 10 phr, including from 1 to 7.5 phr, including from 1 to 5 phr, and preferably from 1 to 3.5 phr.

Vulcanizing accelerators are used to control the time and/or temperature required for vulcanization and to improve properties of the vulcanizate. Examples of suitable vulcanizing accelerators for use in the rubber compositions according to certain embodiments of the first-fourth embodiments disclosed herein include, but are not limited to, thiazole vulcanization accelerators, such as 2-mercaptobenzothiazole, 2,2'-dithiobis(benzothiazole) (MBTS), N-cyclohexyl-2-benzothiazole-sulfenamide (CBS), N-tert-butyl-2-benzothiazole-sulfenamide (TBBS), and the like; guanidine vulcanization accelerators, such as diphenyl guanidine (DPG) and the like; thiuram vulcanizing accelerators; carbamate vulcanizing accelerators; and the like. Generally, the amount of the vulcanization accelerator used ranges from 0.1 to 10 phr, preferably 0.5 to 5 phr.

Vulcanizing activators are additives used to support vulcanization. Generally vulcanizing activators include both an inorganic and organic component. Zinc oxide is the most widely used inorganic vulcanization activator. Various organic vulcanization activators are commonly used including stearic acid, palmitic acid, lauric acid, and zinc salts of each of the foregoing. Generally, the amount of vulcanization activator used ranges from 0.1 to 6 phr, preferably 0.5 to 4 phr.

Vulcanization inhibitors are used to control the vulcanization process and generally retard or inhibit vulcanization until the desired time and/or temperature is reached. Common vulcanization inhibitors include, but are not limited to, PVI (cyclohexylthiophthalmide) from Santogard. Generally, the amount of vulcanization inhibitor is 0.1 to 3 phr, preferably 0.5 to 2 phr.

Other ingredients that may be employed in the rubber compositions of certain embodiments of the first-fourth embodiments disclosed herein are well known to those of skill in the art and include oils (processing and extender), waxes, processing aids, tackifying resins, reinforcing resins, peptizers, and one or more additional rubbers.

Various types of processing oils may be utilized, including, but not limited to aromatic, naphthenic, and low PCA oils. Suitable low PCA oils include those having a polycyclic aromatic content of less than 3 percent by weight as determined by the IP346 method. Procedures for the IP346 method may be found in Standard Methods for Analysis & Testing of Petroleum and Related Products and British Standard 2000 Parts, 2003, 62nd edition, published by the Institute of Petroleum, United Kingdom. Suitable low PCA oils include mild extraction solvates (MES), treated distillate aromatic extracts (TDAE), TRAE, and heavy naphthenics. Suitable MES oils are available commercially as CATENEX SNR from SHELL, PROREX 15 and FLEXON 683 from EXXONMOBLE, VIVATEC 200 from BP, PLAXOLENE MS from TOTALFINAELF, TUDALEN 4160/4225 from DAHLEKE, MES-H from REPSOL, MES from Z8, and OLIO MES S201 from AGIP. Suitable TDAE oils are available as TYREX 20 from EXXONMOBIL, VIVATEC 500, VIVATEC 180 and ENERTHENE 1849 from BP, and EXTENSOIL 1996 from REPSOL. Suitable heavy naphthenic oils are available as SHELLFELX 794, ERGON BLACK OIL, ERGON H2000, CROSS C2000, CROSS C2400, and SAN JOAQUIN 2000L. Suitable low PCA oils also include various plant-sourced oils such as can be harvested from vegetables, nuts, and seeds. Non-limiting examples include, but are not limited to, soy or soybean oil, sunflower oil, safflower oil, corn oil, linseed oil, cotton seed oil, rapeseed oil, cashew oil, sesame oil, camellia oil, jojoba oil, macadamia nut oil, coconut oil, and palm oil. The foregoing processing oils can also be used as an extender oil, i.e., to prepare an oil-extended polymer or copolymer. Generally, the amount of processing oil used ranges from about 1 to about 40 phr, including from about 2 to about 30 phr, including from about 3 to about 20 phr.

Methods for Preparing Rubber Compositions

Also disclosed herein are methods for preparing a rubber composition. The rubber composition may generally be formed by mixing together the ingredients for the rubber composition as disclosed above by methods known in the art, such as, for example, by kneading the ingredients together in a Banbury mixer or on a milled roll. The methods generally include at least one non-productive master-batch mixing stage and a final productive mixing stage. The phrase non-productive master-batch stage is known to those of skill in the art and generally understood to be a mixing stage where no vulcanizing agents or vulcanization accelerators are added. The phrases non-productive stage and master-batch stage are used interchangeably herein with the phrase non-productive master-batch stage. In certain embodiments of the compositions and methods disclosed herein, more than one non-productive master-batch mixing stage may be used; in such embodiments the phrase "non-productive mixing" can be utilized to encompass all non-productive or master-batch mixing stages. The term final productive mixing stage is also known to those of skill in the art and generally understood to be the mixing stage where the vulcanizing agents and vulcanization accelerators are added into the rubber composition.

In certain embodiments, the non-productive master batch mixing stage(s) may be conducted at a temperature of about 130° C. to about 200° C. In certain embodiments, the final productive mixing stage may be conducted at a temperature below the vulcanization temperature in order to avoid unwanted pre-cure of the rubber composition. Therefore, the temperature of the productive mixing stage should not exceed about 120° C. and is typically about 40° C. to about 120° C., or about 60° C. to about 110° C. and, especially, about 75° C. to about 100° C.

In certain embodiments, a rubber composition is prepared according to a method that includes at least one non-productive mixing stage and at least one productive mixture stage, wherein the bi-functional silane coupling agent and the unsaturated, non-sulfur silane coupling agent are added during a non-productive mixing stage. In certain embodiments, the method for preparing the rubber compositions of the present disclosure includes: (1) mixing, in at least one non-productive master-batch stage, a rubber composition comprising: 100 phr of at least one conjugated diene-containing polymer; from about 50 to about 120 phr of at least one reinforcing filler comprising silica or silica in combination with carbon black; a bi-functional silane coupling agent; an unsaturated, non-sulfur silane coupling agent, where the bi-functional silane coupling agent and the unsaturated, non-sulfur silane coupling agent are used in amounts such that their (weight) ratio is about 5:1 to about 20:1; and (2) mixing the resulting product of the non-productive master batch in a final productive stage along with at least one curative, such as a curative package, as discussed above.

In certain embodiments, a rubber composition is prepared according to a method that includes at least two sequential non-productive mixing stages wherein the bi-functional silane coupling agent is added during an initial non-productive mixing stage and the unsaturated, non-sulfur silane coupling agent is added during only the last non-productive mixing stage. The term sequential is meant to denote a stage which occurs after a preceding stage. The term initial is meant to denote a stage which is earlier than last (e.g., considering two non-productive stages, the first would be initial and the second would be final). The term final is meant to denote the last non-productive stage before productive mixing. In certain embodiments, the method for preparing the rubber compositions of the present disclosure may include at least two sequential non-productive mixing stages. In such embodiments, the method includes the steps of mixing, in a first non-productive master-batch stage, a rubber composition comprising: 100 phr of at least one conjugated diene-containing polymer; from about 50 to 120 phr (including 50 to 120 phr) of at least one reinforcing filler comprising silica or silica in combination with carbon black; and a bi-functional silane coupling agent. In a sequential non-productive mixing stage, the unsaturated, non-sulfur silane coupling agent may be added to the mixture from the first non-productive master-batch stage. The bi-functional silane coupling agent and unsaturated, non-sulfur silane coupling agent are used in amounts such that their (weight) ratio is from about 5:1 to about 20:1 (including 5:1 to 20:1). The resulting product of the sequential non-productive master batch stages may then be mixed in a final productive stage along with at least one curative.

Pre-Reaction of Silica Filler and Unsaturated, Non-Sulfur Silane Coupling Agent

In certain embodiments, the method for preparing the rubber compositions disclosed herein is conducted such that at least a portion of the silica filler and at least a portion of the unsaturated, non-sulfur silane coupling agent are pre-reacted prior to addition during non-productive mixing. According to such embodiments, preferably (but not necessarily) all of the unsaturated, non-sulfur silane coupling agent is added via the modified silica that results from the pre-reaction of the silica filler and unsaturated, non-sulfur silane coupling agent. Exemplary methods for pre-reacting silica filler and unsaturated, non-sulfur silane coupling agent are discussed below. The term "pre-reacted" is intended to denote a reaction between the silica filler and the unsaturated, non-sulfur silane coupling agent whereby the unsaturated, non-sulfur silane coupling agent becomes bonded (e.g., via covalent bonds between silicon and oxygen) to the outer surface of the silica filler particles so that the silica filler can be described as "modified." The modification of the surface of the silica filler by the unsaturated, non-sulfur silane coupling agent can be detected by various analytical methods such as NMR (nuclear magnetic resonance). One or more than one modified silica filler (i.e., silica filler pre-reacted with non-sulfur, silane coupling agent) can be utilized; when more than one modified silica filler is utilized the modified silica fillers may differ in underlying silica filler composition; non-sulfur, silane coupling agent; or both. It should be understood that even if silica filler and unsaturated, non-sulfur silane coupling agent are added in pre-reacted form, the resulting rubber composition should be considered to contain both silica filler and unsaturated, non-sulfur silane coupling agent.

In other embodiments, the silica filler and the non-sulfur silane coupling agent are added during non-productive mixing without pre-reacting; in other words, in such embodiments, no pre-reaction of the silica filler and non-sulfur silane coupling agent takes place prior to their addition to the rubber composition during non-productive mixing. Such embodiments can also be described as including in-situ reaction of the silica filler and non-sulfur silane coupling agent within the rubber composition as opposed to the pre-reacting described above. It should be understood that when the silica filler and non-sulfur silane coupling agent are added during non-productive mixing without pre-reacting that they may be added as separate components or they may alternatively be added as one component (e.g., after having been pre-mixed by a procedure that does not result in pre-reaction of the non-sulfur silane coupling agent to the surface of the silica filler).

Various methods for pre-reacting silica filler and unsaturated, non-sulfur silane coupling agent may be utilized. In certain embodiments, the method for pre-reacting includes mixing silica filler with unsaturated, non-sulfur silane coupling agent in the presence of a solvent and optionally in the presence of a Lewis base. At those of skill in the art will understand, a Lewis base is a compound that donates a pair of electrons to a Lewis acid to form a Lewis adduct. In certain embodiments, the method includes refluxing of the unsaturated, non-sulfur silane coupling agent and the silica in the presence of a Lewis base to generate a condensation reaction between hydroxyl functional groups on the surface of the silica and the alkoxy functional groups on the unsaturated, non-sulfur silane coupling agent. One or more than one solvent may be utilized. In certain embodiments, the solvent comprises at least one nonpolar solvent. Various nonpolar solvents can be utilized, although preferably the boiling point of the nonpolar solvent(s) will be greater than the boiling point of any alcohol (e.g., methanol, ethanol, propanol) generated from the condensation reaction. In certain embodiments, the at least one nonpolar solvent has a boiling point of at least about 80° C., at least 80° C., at least about 85° C., at least 85° C., at least about 90° C., at least 90° C., at least about 95° C., at least 95° C., at least about 100° C., at least 100° C., at least about 105° C., at least 105° C., at least about 110° C., or at least 110° C. In certain embodiments, the at least one nonpolar solvent is selected from alkanes having 6 to 9 carbon atoms (e.g., hexane, heptane, nonane), cycloalkanes having 6-9 carbon atoms (e.g., cyclohexane), aromatics and alkyl substituted aromatics (e.g., benzene, toluene, xylene), and combinations thereof. In certain embodiments, the Lewis base comprises an alkyl amine, pyridine or a pyridine-containing compound (e.g., an alkyl pyridine), or a combination thereof. When pre-reacting silica filler with unsaturated, non-sulfur silane coupling agent varying relative amounts of each component may be utilized. In certain embodiments, the unsaturated, non-sulfur silane coupling agent and silica filler are used in a weight ratio of greater than 1:1, i.e., the unsaturated, non-sulfur silane coupling agent is used in a weight amount that exceeds the amount of silica filler for pre-reacting; in certain such embodiments, the weight ratio is greater than 1:1 to 2:1. The amount of solvent used can vary widely and is not considered to be limiting on the pre-reaction as long as sufficient solvent is present to provide a slurry-like consistency and enable mixing of the silica filler and unsaturated, non-sulfur silane coupling agent. The amount of Lewis base used can also vary widely but will generally be a molar amount less than the molar amount of silica; in certain embodiments, the molar ratio of Lewis base to silica filler is about 0.001:1 to about 0.1:1, 0.001:1 to 0.1:1, about 0.001:1 to about 0.01, 0.001 to 0.01, about 0.005:1 to about 0.01:1, or 0.005:1 to 0.01:1.

Pre-reaction of silica filler and unsaturated, non-sulfur silane coupling agent was unexpectedly found to result in an increased reduction in electrical resistance as increasing amounts of modified silica filler (i.e., silica filler pre-reacted with unsaturated, non-sulfur silane coupling agent) were utilized. When modified silica filler (i.e., silica filler pre-reacted with unsaturated, non-sulfur silane coupling agent) is utilized in any of the rubber compositions or method disclosed herein, the relative amount of modified silica filler as compared to the total amount of silica filler (i.e., modified+non-modified silica fillers) can vary from 100% to greater than 10%, 100% to 15% or 100% to 20%. In certain embodiment, the modified silica filler comprises at least 20% by weight of the total amount of silica filler, including 20-50% by weight, 20-55% by weight, 20-60% by weight, 20-70% by weight, 20-80% by weight, 20-90% by weight, or 20-100% by weight as well as 25-50% by weight, 25-55% by weight, 25-60% by weight, 25-70% by weight, 25-80% by weight, 25-90% by weight, and 25-100% by weight.

Methods for Reducing the Electrical Resistance in a Rubber Composition

Also disclosed herein are methods for reducing the electrical resistance in a rubber composition, comprising the use of the rubber compositions disclosed herein. More specifically, these methods comprises the use of a rubber composition comprising 100 phr of at least one conjugated diene-containing polymer, about 50 to about 120 phr (including 50 to 120 phr) of a reinforcing filler comprising silica or silica in combination with carbon black, a bi-functional silane coupling agent, and an unsaturated, non-sulfur silane coupling agent, where the bi-functional silane coupling agent and unsaturated, non-sulfur silane coupling agent are present in amounts such that their (weight) ratio is from about 5:1 to about 20:1 (including 5:1 to 20:1). It has been unexpectedly discovered that the use of the bi-functional silane coupling agent and unsaturated, non-sulfur silane coupling agent, wherein the ratio of the bi-functional silane coupling agent to unsaturated, non-sulfur silane coupling agent in the specified ratio, to form a silica-filled rubber composition, provides a surprising reduction in the electrical resistance of the resulting rubber composition. In certain embodiments, the reduction in the electrical resistivity (Ohm-cm) is at least 10%, at least 20%, at least 30%, at least 40%, at least 50%, more, including about 10% to about 90% (including 10 to 90%). The reduction in electrical resistivity is as compared to a rubber composition containing the same ingredients except for lacking any (i.e., 0 phr) unsaturated, non-sulfur silane coupling agent. Such a reduction in electrical resistivity is exemplified in the working Examples presented below. Furthermore, as exemplified in working Examples 4A-4D an additional reduction in electrical resistivity can be achieved by pre-reacting at least a portion of the silica filler and at least a portion of the unsaturated, non-sulfur silane coupling agent as opposed to allowing the silica filler and unsaturated, non-sulfur silane coupling agent to react in-situ. In certain embodiments that include pre-reacting at least a portion of the silica filler and at least a portion of the unsaturated, non-sulfur silane coupling agent, a reduction in electrical resistivity of at least 20%, at least 30%, at least 40%, at least 50% or more, including up to about 90%, and 20-90%, 30-90%, 40-90%, 20-80%, 30-80%, 40-80%, 20-70%, 30-70%, and 40-70% can be achieved as compared to a rubber composition containing the same ingredients except for lacking any (i.e., 0 phr) unsaturated, non-sulfur silane coupling agent.

A basic method for determining the electrical resistivity of rubber compositions is covered in ASTM D-257, which involves applying a constant voltage to one side of a cured rubber pad of known thickness and using an electrode of known surface area to measure the current that passes through the cured rubber pad. From this, the resistance ($\Omega$) of the pad can be calculated. Resistance is further reduced to a material property, resistivity ($\rho$) based on the dimensions of the pad and the electrode ($\Omega = \rho$*rubber pad thickness/area of electrode). As those of skill in the art will understand, resistance is a measured quantity of a sample of known dimensions and resistivity is a derived material property, regardless of dimensions. Using a material with lower resistivity within the same defined dimensions, will result in lower electrical resistance. Within a tire comprised of multiple, unique rubber compositions, the resistance of any individual component can be approximated by the formula stated above, based on the dimensions of the cured component. The approximate electrical resistance of a whole tire can be further calculated by the following equation, Rpath=R1+R2+R3 . . . , where Rpath is the resistance of the pathway and Rx represents the resistance of each unique component within a unique layer extending radially from the centerline of the tire to bead. The construction of a radial tire results in several unique layers of compounds extending from the centerline to the bead, so the total tire resistance can be calculated by the following equation, 1/Rtire=1/Rpath1+ 1/Rpath2+1/Rpath3 . . . . Practically speaking, however, the electrical resistance of the whole tire is generally dominated by one or two compounds having resistance values of greater than $1 \times 10^{12}$ ohms.

As previously discussed, certain embodiments disclosed herein include tires and tire treads comprising the rubber composition as otherwise disclosed herein, i.e., comprising 100 phr of at least one conjugated diene-containing polymer, about 50 to about 120 phr of a reinforcing filler comprising silica or silica in combination with carbon black, a bi-functional silane coupling agent, and an unsaturated, non-sulfur silane coupling agent, where the bi-functional silane coupling agent and unsaturated, non-sulfur silane coupling agent are present in amounts such that their (weight) ratio is from about 5:1 to about 20:1. More specifically, the present disclosure includes a tire comprising the rubber composition as otherwise disclosed herein, a tire comprising a tire tread comprising the rubber composition as otherwise disclosed herein, and a tire tread comprising the rubber composition as otherwise disclosed herein. Generally, when the rubber compositions disclosed herein are utilized in tires or tire treads, these compositions are processed into tire components according to ordinary tire manufacturing techniques including standard rubber shaping, molding, and curing techniques. Any of the various rubber tire components can be fabricated including, but not limited to, treads, sidewalls, belt skims, and carcass. Typically, vulcanization is effected by heating the vulcanizable composition in a mold; e.g., it may be heated to about 140° C. to about 180° C. Cured or crosslinked rubber compositions may be referred to as vulcanizates, which generally contain three-dimensional polymeric networks that are thermoset. The other ingredients, such as processing aides and fillers, may be evenly dispersed throughout the vulcanized network. In certain embodiments, pneumatic tires containing the rubber compositions as disclosed herein can be produced as discussed in U.S. Pat. Nos. 5,866,171, 5,876,527, 5,931,211, and 5,971,046, which are incorporated herein by reference.

EXAMPLES

The following examples illustrate specific and exemplary embodiments and/or features of the embodiments of the present disclosure. The examples are provided solely for the purposes of illustration and should not be construed as limitations of the present disclosure. Numerous variations over these specific examples are possible without departing from the spirit and scope of the presently disclosed embodiments. More specifically, the conjugated diene-containing polymers, reinforcing filler, and other ingredients (e.g., processing oil, antioxidant, and curative package ingredients) utilized in the following examples should not be interpreted as limiting since other such ingredients consistent with the disclosure in the Detailed Description can be utilized in substitution. In other words, the particular bi-functional silane coupling agents, unsaturated, non-sulfur silane coupling agents, their amounts and their relative amounts in the following examples should be understood to apply to the more general content of the Detailed Description.

In each of the following Examples 1 and 2, rubber compositions were prepared where the amount of unsaturated, non-sulfur silane coupling agent was varied. In each of the following Examples 1 and 2, the unsaturated, non-sulfur silane coupling agent was triethoxyphenyl silane, and it was utilized in the amounts indicated in the following tables (i.e., at 0, 5, 10, and 20% of the loading of bi-functional silane coupling agent). The rubber compositions thus utilized the bi-functional silane coupling agent and the unsaturated, non-sulfur silane coupling agent at ratios indicated in the following tables (i.e., at ratios of 20:1, 10:1 and 5:1). The bi-functional silane coupling agent used was either a mercapto silane or a disulfide (bis(triethoxysilylpropyl) disulfide). In the Tables that follow the abbreviation BR is used for polybutadiene polymer, the abbreviation SBR is used for styrene-butadiene copolymer, s-SBR is used to indicate solution polymerized SBR, and NR is used for natural rubber.

Example 1

Rubber compositions were prepared comprising the components presented in Table 1A and using the mixing procedure presented in Table 1B.

TABLE 1A

| Sample # | 1A (Control) | 1B | 1C | 1D |
|---|---|---|---|---|
| Master-Batch First non-productive | | | | |
| BR (polybutadiene) | 10 | 10 | 10 | 10 |
| s-SBR (oil-extended) | 45.5 | 45.5 | 45.5 | 45.5 |
| NR (natural rubber) | 15 | 15 | 15 | 15 |
| SBR (functionalized with silica-reactive moiety) | 40 | 40 | 40 | 40 |
| Carbon black filler | 8 | 8 | 8 | 8 |
| Silica filler | 49 | 49 | 49 | 49 |
| Triethoxyphenyl silane | 0 | 0.41 | 0.81 | 1.6 |
| Mercapto silane | 4.9 | 4.9 | 4.9 | 4.9 |
| Processing oil | 7 | 7 | 7 | 7 |
| Antioxidant | 1.5 | 1.5 | 1.5 | 1.5 |
| Vulcanizing activator | 4.1 | 4.1 | 4.1 | 4.1 |
| Second non-productive stage | | | | |
| Silica filler | 32 | 32 | 32 | 32 |
| Mercapto silane | 3.2 | 3.2 | 3.2 | 3.2 |
| Antioxidant | 1.05 | 1.05 | 1.05 | 1.05 |
| Vulcanizing activator | 2.4 | 2.4 | 2.4 | 2.4 |
| Final Batch | | | | |
| Vulcanizing agent (sulfur) | 1.6 | 1.6 | 1.6 | 1.6 |
| Vulcanizing activator | 2.5 | 2.5 | 2.5 | 2.5 |
| Vulcanizing accelerator | 2.4 | 2.4 | 2.4 | 2.4 |
| Vulcanizing inhibitor | 0.10 | 0.10 | 0.10 | 0.10 |
| Antioxidant | 0.22 | 0.22 | 0.22 | 0.22 |
| Total phr | 230.47 | 230.88 | 231.28 | 232.07 |
| Total phr reinforcing filler | 89 | 89 | 89 | 89 |
| % silica of reinforcing filler | 91 | 91 | 91 | 91 |
| Ratio of bi-functional silane coupling agent to unsaturated, non-sulfur silane coupling agent | 0 | 20/1 | 10/1 | 5/1 |

TABLE 1B

| Mixing Parameters | | |
|---|---|---|
| Stage | Time | Condition |
| Master-Batch Stage (initial temp: 105° C., rotor 50 rpm) | 0 seconds | Charge polymers |
| | 35 seconds | Charge filler (silica) and other master-batch ingredients |
| | 370 seconds | Drop based on time or max temperature of 155° C. |
| Remill Stage (initial temp: 105° C., rotor rpm at 50) | 0 seconds | Charge Master-Batch |
| | 120 seconds | Drop on mixing time or max temperature of 149° C. |
| Final Batch Stage (initial temp: 80° C., rotor rpm at 50) | 0 seconds | Charge Remill |
| | 0 seconds | Charge final batch ingredients |
| | 120 seconds | Drop on mixing time or max temperature of 99° C. |

After curing, each of the rubber compositions of Examples 1A-1D was tested for electrical resistance and tensile properties. The results are shown in Table 2. The abbreviation EB is used for elongation at break, which measurement provides an indication of a rubber component's tear resistance, which is relevant when it is incorporated into a tire tread.

Tensile mechanical properties of the samples were determined following the guidelines, but not restricted to, the standard procedure described in ASTM D-412, using dumbbell-shaped samples with a cross-section dimension of 4 mm in width and 1.9 mm in thickness at the center. Specimens were strained at a constant rate and the resulting force was recorded as a function of extension (strain). Force readings are shown in Table 2 below as engineering-stresses by reference to the original cross-sectional area of the test piece. The specimens were tested at 23° C. As indicated in the Table, the elongation at break was measured after 40 minutes and after sweeping the temperature from either 25° C. or 100° C. to 150° C. Samples were cured for 40 minutes at 150° C., then tensile properties were analyzed at 25° C. and at 100° C.

Resistivity measurements were made as follows. Specimens from the rubber compositions in the form of 2.0 mm thick pads were obtained, cured for 40 minutes at 150° C., and tested according to a procedure based on ASTM-D257, as described above.

Indexed values represent the test sample divided by the control sample with the index value for the control being set at 1.00. As can be seen from the data in Table 2, the use of the unsaturated, non-sulfur silane coupling agent and bi-functional silane coupling agent, resulted in an decrease in the resistivity of rubber compositions 1B-1D as compared to the control 1A. Notably, compositions IC and 1D showed the more significant reduction, with the resistivity being only about 15% of the resistivity of the control composition. As well, the reduction in resistivity was achieved without any significant reduction in the physical properties of the rubber compositions.

TABLE 2

| Test (units) | 1A (Control) | 1B | 1C | 1D |
|---|---|---|---|---|
| Resistivity (Ohm-cm) | 7.84E+14 | 6.26E+14 | 8.99E+13 | 8.89E+13 |
| Indexed resistivity | 1.00 | 0.80 | 0.15 | 0.13 |
| Resistivity (Log Ohm-cm) | 14.89 | 14.80 | 13.95 | 13.95 |
| Indexed resistivity (log values) | 1.00 | 0.99 | 0.94 | 0.94 |
| EB, 40 min @150° C., 25° C. (%) | 519 | 518 | 495 | 477 |
| Indexed EB, 40 min @ 150° C., 25° C. (%) | 1.00 | 1.00 | 0.95 | 0.92 |
| EB, 40 min @150° C., 100° C. (%) | 401 | 388 | 366 | 370 |
| Indexed EB, 40 min @ 150° C., 100° C. (%) | 1.00 | 0.97 | 0.91 | 0.92 |

Example 2

Rubber compositions were prepared comprising the components presented in Table 3 and using the mixing procedure presented in Table 1B.

TABLE 3

| Sample # | 2A (Control) | 2B | 2C | 2D |
|---|---|---|---|---|
| Master-Batch First non-productive | | | | |
| BR (polybutadiene) | 20 | 20 | 20 | 20 |
| s-SBR 1 (oil-extended) | 30.94 | 30.94 | 30.94 | 30.94 |
| s-SBR 2 (oil-extended) | 79.06 | 79.06 | 79.06 | 79.06 |
| Carbon black filler | 34.4 | 34.4 | 34.4 | 34.4 |
| Silica filler | 33.6 | 33.6 | 33.6 | 33.6 |
| Triethoxyphenyl silane | 0 | 0.24 | 0.48 | 0.96 |
| bis(Triethoxysilylpropyl)disulfide | 3 | 3 | 3 | 3 |
| Processing oil | 9.3 | 9.3 | 9.3 | 9.3 |
| Antioxidant | 1.5 | 1.5 | 1.5 | 1.5 |
| Vulcanizing activator | 1 | 1 | 1 | 1 |
| Second non-productive stage | | | | |
| Silica filler | 21 | 21 | 21 | 21 |
| bis(Triethoxysilylpropyl)disulfide | 1.8 | 1.8 | 1.8 | 1.8 |
| Antioxidant | 1.22 | 1.22 | 1.22 | 1.22 |

TABLE 3-continued

| Sample # | 2A (Control) | 2B | 2C | 2D |
|---|---|---|---|---|
| Final Batch | | | | |
| Vulcanizing agent (sulfur) | 2.1 | 2.1 | 2.1 | 2.1 |
| Vulcanizing activator | 2.5 | 2.5 | 2.5 | 2.5 |
| Vulcanizing accelerator | 2.6 | 2.6 | 2.6 | 2.6 |
| Total phr | 244.02 | 244.26 | 244.50 | 244.98 |
| Total phr reinforcing filler | 89 | 89 | 89 | 89 |
| % silica of reinforcing filler | 61.35 | 61.35 | 61.35 | 61.35 |
| Ratio of bi-functional silane coupling agent to unsaturated, non-sulfur silane coupling agent | 0 | 20/1 | 10/1 | 5/1 |

After curing, each of the rubber compositions of Examples 2A-2D were tested for electrical resistance and tensile properties, as described above. The results are shown in Table 4. Indexed values represent the test sample divided by the control sample with the index value for the control being set at 1.00.

As can be seen from the data in Table 4, the use of the unsaturated, non-sulfur silane coupling agent and bi-functional silane coupling agent, resulted in an decrease in the resistivity of rubber compositions 2B-2D as compared to the control 2A. As well, the reduction in resistivity was achieved without any significant reduction in the physical properties of the rubber compositions.

TABLE 4

| Test (units) | 2A | 2B | 2C | 2D |
|---|---|---|---|---|
| Resistivity (Ohm-cm) | 2.87E+11 | 1.52E+11 | 2.55E+11 | 1.56E+11 |
| Indexed resistivity | 1.00 | 0.53 | 0.89 | 0.55 |
| Resistivity (Log Ohm-cm) | 11.46 | 11.18 | 11.41 | 11.19 |
| Indexed resistivity (log values) | 1.00 | 0.98 | 1.00 | 0.98 |
| EB, 40 min @ 150° C., 25° C. (%) | 558 | 453 | 527 | 522 |
| Indexed EB, 40 min @ 150° C., 25° C. (%) | 1.00 | 0.81 | 0.94 | 0.94 |
| EB, 40 min @ 150° C., 100° C. (%) | 459 | 366 | 428 | 417 |
| Indexed EB, 40 min @ 150° C., 100° C. (%) | NA | 0.80 | 0.93 | 0.91 |

Example 3

In Example 3, rubber compositions were prepared comprising the components presented in Table 5. However, the unsaturated, non-sulfur silane coupling agent was added at 10% of the loading of bi-functional silane coupling agent, and was added during non-productive mixing stage 1, non-productive mixing stage 2, or the productive mixing stage (Examples 3B-3D, respectively).

TABLE 5

| Sample # | 3A (Control) | 3B | 3C | 3D |
|---|---|---|---|---|
| Master-Batch First non-productive | | | | |
| BR (polybutadiene) | 10 | 10 | 10 | 10 |
| s-SBR 1 (oil-extended) | 45.5 | 45.5 | 45.5 | 45.5 |
| s-SBR 2 (functionalized) | 20 | 20 | 20 | 20 |
| NR (natural rubber) | 35 | 35 | 35 | 35 |
| Carbon black filler | 11 | 11 | 11 | 11 |

TABLE 5-continued

| Sample # | 3A (Control) | 3B | 3C | 3D |
|---|---|---|---|---|
| Silica filler | 52.5 | 52.5 | 52.5 | 52.5 |
| Triethoxyphenyl silane | 0 | 0.5 | 0 | 0 |
| bis(Triethoxysilylpropyl)disulfide | 4.2 | 4.2 | 4.2 | 4.2 |
| Processing oil | 9.5 | 9.5 | 9.5 | 9.5 |
| Second non-productive stage | | | | |
| Silica filler | 10 | 10 | 10 | 10 |
| bis(Triethoxysilylpropyl)disulfide | 0.8 | 0.8 | 0.8 | 0.8 |
| Antioxidant | 1.09 | 1.09 | 1.09 | 1.09 |
| Vulcanizing activator | 1.5 | 1.5 | 1.5 | 1.5 |
| Triethoxyphenyl silane | 0 | 0 | 0.5 | 0 |
| Final Batch | | | | |
| Vulcanizing agent (sulfur) | 1.76 | 1.76 | 1.76 | 1.76 |
| Vulcanizing activator | 2.5 | 2.5 | 2.5 | 2.5 |
| Vulcanizing accelerator | 2.6 | 2.6 | 2.6 | 2.6 |
| Triethoxyphenyl silane | 0 | 0 | 0 | 0.5 |
| Total phr | 211.95 | 212.45 | 212.45 | 212.45 |
| Total phr reinforcing filler | 73.5 | 73.5 | 73.5 | 73.5 |
| % silica of reinforcing filler | 85.03 | 85.03 | 85.03 | 85.03 |
| Ratio of bi-functional silane coupling agent to unsaturated, non-sulfur silane coupling agent | 0 | 10/1 | 10/1 | 10/1 |

After curing, each of the rubber compositions of Examples 3A-3D were tested for electrical resistance and tensile properties, as described above. The results are shown in Table 6. Indexed values represent the test sample divided by the control sample with the index value for the control being set at 1.00.

As can be seen from the data in Table 6, the use of the unsaturated, non-sulfur silane coupling agent and bi-functional silane coupling agent in the second, non-productive mixing stage resulted in a significant reduction in resistivity of rubber composition 3C compared to the control 3A, with the resistivity being only about 16% of the resistivity of the control composition. However, the use of the unsaturated, non-sulfur silane coupling agent during the first, non-productive mixing stage and the final, productive mixing stage was less effective in reducing the resistivity of rubber compositions 3B and 3D. As well, the reduction in resistivity was achieved without any significant reduction in the physical properties of the rubber compositions.

TABLE 6

| Test (units) | 3A | 3B | 3C | 3D |
|---|---|---|---|---|
| Resistivity (Ohm-cm) | 9.48E+13 | 2.13E+14 | 1.58E+13 | 8.41E+13 |
| Indexed resistivity | 1.00 | 2.24 | 0.16 | 0.89 |
| Resistivity (Log Ohm-cm) | 13.98 | 14.33 | 13.20 | 13.92 |
| Indexed resistivity (log values) | 1.00 | 1.03 | 0.94 | 1.00 |
| EB, 40 min @ 150° C., 25° C. (%) | — | — | — | — |
| Indexed EB, 40 min @ 150° C., 25° C. (%) | 1.00 | — | — | — |
| EB, 40 min @ 150° C., 100° C. (%) | 438 | 425 | 436 | 422 |
| Indexed EB, 40 min @ 150° C., 100° C. (%) | 1.00 | 0.97 | 1.00 | 0.96 |

Example 4

Rubber compositions were prepared comprising the components presented in Table 7 and using the mixing procedure presented in Table 1B. Compositions 4B, 4C and 4D utilized 10, 20, and 40 phr, respectively of modified silica in replace of an equivalent amount of non-modified silica filler as used in control composition 4A. The modified silica was prepared by pre-reacting silica filler and triethoxyphenylsilane according to the following procedure. Bulk silica powder (100 grams) and triethoxyphenylsilane (105 grams) were mixed in 400 mL of toluene using a stir bar, along with triethylamine (2.3 milliliters). The mixing took place at reflux temperature (approximately 110° C. for toluene) for 24 hours. Thereafter, the modified silica powder was isolated from the solvent by sequential rinses with methylene chloride and acetone and dried using vacuum dessication for 18 hours. The pre-reaction of the triethoxyphenylsilane with the silica filler was confirmed by 29Si NMR analysis whereby peaks corresponding to the reacted silane were observed between −50 and −85 ppm.

TABLE 7

| Sample # | 4A (Control) | 4B | 4C | 4D |
|---|---|---|---|---|
| Master-Batch First non-productive | | | | |
| BR (polybutadiene) | 10 | 10 | 10 | 10 |
| s-SBR (oil-extended) | 45.5 | 45.5 | 45.5 | 45.5 |
| NR (natural rubber) | 15 | 15 | 15 | 15 |
| SBR (functionalized with silica-reactive moiety) | 40 | 40 | 40 | 40 |
| Carbon black filler | 8 | 8 | 8 | 8 |
| Silica filler | 49 | 49 | 49 | 41 |
| Modified silica filler | 0 | 0 | 0 | 8 |
| Mercapto silane | 4.9 | 4.9 | 4.9 | 4.9 |
| Processing oil | 7 | 7 | 7 | 7 |
| Antioxidant | 1.5 | 1.5 | 1.5 | 1.5 |
| Vulcanizing activator | 4.1 | 4.1 | 4.1 | 4.1 |
| Second non-productive stage | | | | |
| Silica filler | 32 | 22 | 12 | 0 |
| Modified silica filler | 0 | 10 | 20 | 32 |
| Mercapto silane | 3.2 | 3.2 | 3.2 | 3.2 |
| Vulcanizing activator | 2.4 | 2.4 | 2.4 | 2.4 |
| Final Batch | | | | |
| Vulcanizing agent (sulfur) | 1.6 | 1.6 | 1.6 | 1.6 |
| Vulcanizing activator | 2.5 | 2.5 | 2.5 | 2.5 |
| Vulcanizing accelerator | 2.4 | 2.4 | 2.4 | 2.4 |
| Total phr | 229.1 | 229.1 | 229.1 | 229.1 |
| Total phr reinforcing filler | 89 | 89 | 89 | 89 |
| % silica of reinforcing filler | 91 | 91 | 91 | 91 |
| Ratio of bi-functional silane coupling agent to unsaturated, non-sulfur silane coupling agent | 0 | 20/1 | 10/1 | 5/1 |

After curing, each of the rubber compositions of Examples 4A-4D were tested for electrical resistance and a viscoelastic temperature sweep was conducted for each. The rubber compositions of Examples 4A-4D were not tested for the tensile properties (i.e., elongation at break or EB in contrast to the previous rubber compositions). The viscoelastic temperature sweep for the tan δ measurements was conducted using a dynamic mechanical thermal spectrometer (Eplexor® 500N from Gabo Qualimeter Testanlagen GmbH of Ahiden, Germany) under the following conditions: measurement mode: tensile test mode, measuring frequency: 52 Hz, applying 0.2% strain from 50 to −5° C. and 1% strain from −5 to 65° C., measuring temperatures (0° C., 30° C. and 60° C.), sample shape: 4.75 mm wide×29 mm long×2.0 mm thick. A rubber composition's tan δ at 0° C. is indicative of its wet traction when incorporated into a tire tread, its tan δ at 30° C. is indicative of its dry traction when incorporated into a tire tread and its tan δ at 60° C. is indicative of its rolling resistance when incorporated into a tire tread. Higher values of tan δ at 0° C. and 30° C. are beneficial (indicating improved wet and dry traction) whereas lower values of tan δ at 60° C. are beneficial (indicating reduced rolling resistance which equates to improved fuel economy). The results are shown in Table 8. Indexed values represent the test sample divided by the control sample with the index value for the control being set at 1.00.

TABLE 8

| Test (units) | 4A | 4B | 4C | 4D |
|---|---|---|---|---|
| Resistivity (Ohm-cm) | 8.8E+13 | 1.41E+14 | 3.55E+13 | 2.65E+13 |
| Indexed resistivity | 1.00 | 1.60 | 0.40 | 0.29 |
| Resistivity (Log Ohm-cm) | 13.94 | 14.15 | 13.55 | 13.42 |
| Indexed resistivity (log values) | 1.00 | 1.01 | 0.97 | 0.96 |
| Indexed tan δ at 0° C. | 1.00 | 1.14 | 1.23 | 1.27 |
| Indexed tan δ at 30° C. | 1.00 | 1.18 | 1.29 | 1.35 |
| Indexed tan δ at 60° C. | 1.00 | 1.14 | 1.19 | 1.25 |

As can be seen from the data in Table 8, the replacement of 20 or 40 phr of silica filler with the modified silica filler (i.e., silica filler pre-reacted with triethoxyphenylsilane) resulted in a significant reduction in the resistivity of rubber compositions 4C and 4D as compared to control composition 4A, with the larger amount of modified silica filler resulting in a more significant decrease. The resistivity of rubber composition 4C was about 40% that of control composition 4A and the resistivity of rubber composition 4D was about 30% that of control composition 4A. The replacement of 10, 20 or 40 phr of silica filler with the modified silica filler also resulted in an unexpected but consistent beneficial increase of at least 10% in tan δ at 0° C. and 30° C. (rubber compositions 4B, 4C, and 4D) as compared to control composition 4A.

This application discloses several numerical range limitations that support any range within the disclosed numerical ranges, even though a precise range limitation is not stated verbatim in the specification, because the embodiments of the compositions and methods disclosed herein could be practiced throughout the disclosed numerical ranges. With respect to the use of substantially any plural or singular terms herein, those having skill in the art can translate from the plural to the singular or from the singular to the plural as is appropriate to the context or application. The various singular or plural permutations may be expressly set forth herein for sake of clarity.

It will be understood by those within the art that, in general, terms used herein, and especially in the appended claims are generally intended as "open" terms. For example, the term "including" should be interpreted as "including but not limited to," the term "having" should be interpreted as "having at least," the term "includes" should be interpreted as "includes but is not limited to." It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references, including but not limited to patents, patent applications, and non-patent literature are hereby incorporated by reference herein in their entirety.

While various aspects and embodiments of the compositions and methods have been disclosed herein, other aspects and embodiments will be apparent to those skilled in the art. The various aspects and embodiments disclosed herein are for purposes of illustration and are not intended to be limiting, with the true scope and spirit being indicated by the claims.

What is claimed is:

1. A tire rubber composition comprising:
   (a) 100 phr of at least one conjugated diene-containing polymer,
   (b) about 50 to about 120 phr reinforcing filler comprising silica or silica in combination with carbon black,
   (c) a bi-functional sulfur-containing silane coupling agent, and
   (d) an unsaturated, non-sulfur silane coupling agent, wherein the ratio of (c) to (d) is from about 5:1 to about 20:1 and wherein the bi-functional sulfur-containing silane coupling agent is a mercapto silane compound, a blocked mercapto silane compound, or a disulfide-based alkoxy-containing silane compound, and the unsaturated, non-sulfur silane coupling agent (d) has the formula $(R^1L_m)_n Si(OR^2)_{4-n}$,
   where n is an integer selected from 0 or 1,
   $R^1$ is selected from
      (iv) aryl having 6-14 carbon atoms and
      (v) aralkyl having 6-14 carbon atoms;
   L is a divalent hydrocarbyl having 1-5 carbon atoms where m is 1, and
   $R^2$ is selected from hydrocarbyl having 1-6 carbon atoms.

2. The tire rubber composition of claim 1, wherein the bi-functional sulfur-containing silane coupling agent is present in an amount of 1 to 20 phr, and the unsaturated, non-sulfur silane coupling agent is present in an amount of 0.05 to 4 phr.

3. The tire rubber composition of claim 1, wherein the amount of carbon black filler is no more than 30% by weight of the total reinforcing filler.

4. The tire rubber composition of claim 1, wherein the bi-functional sulfur-containing silane coupling agent (c) is a disulfide-based alkoxy-containing silane compound.

5. The tire rubber composition of claim 1, wherein $R^1$ is (iv).

6. The tire rubber composition of claim 1, wherein $R^1$ is (v).

7. The tire rubber composition of claim 1, wherein the ratio of (c) to (d) is from about 7:1 to about 10:1.

8. The tire rubber composition of claim 1, wherein the at least one conjugated diene-containing polymer includes natural rubber.

9. The tire rubber composition of claim 1, wherein the at least one conjugated diene-containing polymer includes 10-90 phr of a functionalized polymer.

10. The tire rubber composition of claim 9, wherein the functionalized polymer contains a silica-reactive functional group.

11. The tire rubber composition of claim 1, wherein 100 phr of the at least one conjugated diene-containing polymer is selected from the group consisting of polybutadiene, styrene-butadiene, natural rubber, polyisoprene, and combinations thereof.

12. A tire rubber composition comprising:
   100 phr of at least one conjugated diene-containing polymer,
   a pre-reacted combination of reinforcing silica filler and an unsaturated, non-sulfur silane coupling agent, and
   a bi-functional sulfur-containing silane coupling agent,
   wherein a total of about 50 to about 120 phr of reinforcing filler comprising the reinforcing silica filler or reinforcing silica filler in combination with carbon black is used,
   the ratio of the bi-functional sulfur-containing silane coupling agent to unsaturated, non-sulfur silane coupling agent is from about 5:1 to about 20:1,
   wherein the bi-functional sulfur-containing silane coupling agent is a mercapto silane compound, a blocked mercapto silane compound, or a disulfide-based alkoxy-containing silane compound, and the unsaturated, non-sulfur silane coupling agent (d) has the formula $(R^1L_m)_nSi(OR^2)_{4-n}$,
   where n is an integer selected from 0 or 1,
   $R^1$ is selected from
      (iv) aryl having 6-14 carbon atoms and
      (v) aralkyl having 6-14 carbon atoms;
   L is a divalent hydrocarbyl having 1-5 carbon atoms where m is 1, and
   $R^2$ is selected from hydrocarbyl having 1-6 carbon atoms.

13. The tire rubber composition of claim 12, wherein the bi-functional sulfur-containing silane coupling agent is present in an amount of 1 to 20 phr, and the unsaturated, non-sulfur silane coupling agent is present in an amount of 0.05 to 4 phr.

14. The tire rubber composition of claim 13, wherein the unsaturated, non-sulfur silane coupling agent is triethoxyphenylsilane.

15. The tire rubber composition of claim 14, wherein the bi-functional sulfur-containing silane coupling agent is a mercapto silane compound.

16. The tire rubber composition of claim 12, wherein $R^1$ is (iv).

17. The tire rubber composition of claim 12, wherein the unsaturated, non-sulfur silane coupling agent is triethoxyphenylsilane.

18. The tire rubber composition of claim 12, wherein the bi-functional sulfur-containing silane coupling agent is a mercapto silane compound.

* * * * *